US010547976B2

(12) United States Patent
Ali et al.

(10) Patent No.: US 10,547,976 B2
(45) Date of Patent: Jan. 28, 2020

(54) METHOD AND SYSTEM FOR ASSIGNING POINT OF SALE INFORMATION

(71) Applicant: InvenSense, Inc., San Jose, CA (US)

(72) Inventors: Abdelrahman Ali, Calgary (CA); Jacques Georgy, Calgary (CA); Tao Li, Calgary (CA); Sheng Mao, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 283 days.

(21) Appl. No.: 15/258,906

(22) Filed: Sep. 7, 2016

(65) Prior Publication Data

US 2018/0070213 A1   Mar. 8, 2018

(51) Int. Cl.
| | |
|---|---|
| *H04W 4/02* | (2018.01) |
| *G06Q 30/02* | (2012.01) |
| *G01C 21/20* | (2006.01) |
| *H04W 4/029* | (2018.01) |
| *H04W 4/024* | (2018.01) |
| *H04W 4/33* | (2018.01) |

(52) U.S. Cl.
CPC .......... *H04W 4/026* (2013.01); *G01C 21/206* (2013.01); *G06Q 30/0255* (2013.01); *H04W 4/024* (2018.02); *H04W 4/029* (2018.02); *H04W 4/33* (2018.02)

(58) Field of Classification Search
CPC ...... G01C 21/206; G01C 21/14; G01C 21/28; G01C 21/3617; H04W 4/029; H04W 4/026; H04W 4/04; H04W 64/00; G06Q 30/0238; G06Q 30/0255; G06Q 30/0261
See application file for complete search history.

(56) References Cited

U.S. PATENT DOCUMENTS

| | | | | |
|---|---|---|---|---|
| 9,147,208 | B1* | 9/2015 | Argue | G06Q 30/06 |
| 2008/0165053 | A1* | 7/2008 | Liu | G01S 19/32 |
| | | | | 342/357.27 |
| 2009/0224977 | A1* | 9/2009 | Bonner | G01S 5/02 |
| | | | | 342/378 |
| 2014/0114561 | A1* | 4/2014 | Pakzad | G01C 21/206 |
| | | | | 701/410 |
| 2015/0281910 | A1* | 10/2015 | Choudhury | G01S 5/021 |
| | | | | 455/456.1 |
| 2016/0321679 | A1* | 11/2016 | Dong | G06Q 30/0201 |
| 2017/0006429 | A1* | 1/2017 | Douglas | H04W 4/027 |

* cited by examiner

*Primary Examiner* — Margaret G Mastrodonato
(74) *Attorney, Agent, or Firm* — Bay Area Technology Law Group PC

(57) ABSTRACT

One or more sets of anchor points may be assigned to one or more trajectories of a portable device by scoring each anchor point set with respect to each trajectory. The score for an anchor point set may be determined by cumulating the differences between each anchor point in the set with its closest trajectory segment.

56 Claims, 27 Drawing Sheets

METHOD AND SYSTEM FOR ASSIGNING POINT OF SALE INFORMATION

FIELD OF THE PRESENT DISCLOSURE

The present disclosure relates to a method and system for assigning set of anchor points, such as may be derived from point of sale data, with a trajectory constructed for a portable device conveyed by a platform (such as for example person, vehicle, or vessel), wherein the device can be strapped or non-strapped to the platform, and wherein in case of non-strapped mobility of the device may be constrained or unconstrained within the platform, and wherein the device can be tilted to any orientation.

BACKGROUND

Portable electronic devices, such as those configured to be handheld or otherwise associated with a user, are employed in a wide variety of applications and environments. Increasingly, such devices are equipped with one or more sensors or other systems for determining the position or motion of the portable device. Notably, devices such as smartphones, tablets, smart watches or other portable devices may feature Global Navigation Satellite Systems (GNSS) receivers, low cost Micro Electro-Mechanical Systems (MEMS) inertial sensors, barometers and magnetometers. GNSS and multi-sensors can be integrated to provide promising positioning results in most outdoor environments. However, some mass market applications require seamless positioning capabilities in all kinds of environments such as malls, offices or underground parking lots. In the absence of GNSS signals in indoor environments, the conventional Strapdown Inertial Navigation System (SINS) that uses low cost inertial sensors, suffers significant performance degradation due to the accumulated sensor drifts and bias. As such, positioning technologies relying solely on motion sensors may not satisfy all requirements for seamless indoor and outdoor navigation applications.

Pedestrian Dead Reckoning (PDR) is an example of a technique for indoor/outdoor positioning, and has become the focus of industrial and academic research recently. Similar to the SINS, PDR accumulates successive displacement from a known starting point to derive the position. This displacement (step length) can be estimated with various algorithms within a certain accuracy using the inertial sensor measurements. The position error using step lengths from PDR accumulates much slower than that from the accelerometer derived displacement from SINS. The PDR shows improved performance over SINS without GNSS updates. However, PDR still lacks robustness because of the accumulated heading error. Conventional methods of complementing sensor-based navigation include systems that are based on trilateration of received wireless signals, such as WiFi™ access points or dedicated beacons. As will be recognized, such methods involve considerable additional equipment and deployment overhead.

The performance of SINS and/or PDR techniques may be significantly improved if corrections are available during the positioning trajectory. For example, a source of position information that may be used to correct a sensor-based solution may be termed an "anchor point," which generally means a source of position information that is known without reference to motion sensor data. One potential resource for deriving anchor points that may be used to supplement a position solution exists when a user carries the portable device through a retail venue. By analyzing point of sale data, it may be determined which items were purchased by the user. Accordingly, each purchased item may constitute an anchor point if the absolute position of the item within the retail venue is known. Notably, each product may have a designated location on shelves or other display features within the retail venue that may be stored in a database maintained by retail venue or provided by third parties that provide store maps and product shelf databases. Other similar services may also be employed. An interaction between the user and each item purchased may be assumed, involving the user taking the item from its shelf location in association with buying it, indicating the user was at the location corresponding to the item's position in the retail venue. Accordingly, a list of items purchased during a transaction represents a set of anchor points that may be associated with a trajectory through the store. Anchor points may also be used in other venues, such as office buildings, hospitals, malls, conference centers, exhibition halls, museums and the like.

In addition to aiding a navigation solution, analytics involving marketing, advertising, and shopper behavior may all be significantly facilitated by using knowledge of a user's trajectory through a venue, such as a retail store. As will be appreciated, understanding how a user navigates through a store reveals a wealth of information useful to retailers, manufacturers, advertisers, and other commercial entities. By analyzing the trajectory, insight may be gained for redesigning or otherwise optimizing store layout, such as by reorganizing product placement to enhance sales. Further, the success of packaging designs and advertising strategies may be gauged as well as other aspects of influencing purchasing decisions. Other examples of information that may be determined from a user's trajectory and point of sale information include identification of missed conversions, metrics regarding the user's experience such as check out duration or queue measurement, purchase sequence, and traffic flow by a department, end-cap, aisle, and category. By using location information for users, retailers may retarget consumers based on their in-store browsing and shopping history, leading to improvements in conversion rates and customer loyalty.

To obtain the advantages associated with using anchor points to help provide navigation solutions for a portable device, the proper set of anchor points must be correctly correlated to the motion sensor data representing the user's travel through the venue. Depending upon the source of the anchor point information and the user's privacy settings, situations may exist in which one or more sets of anchor points are not positively identified with a specific user. For example, some retail stores may have loyalty programs to encourage and attract the customers to visit the store, while other stores may have applications that run on a portable device to guide a user through a venue and locate items of interest, such as sales. However, if the user has not signed in or otherwise provided identification, there may be no direct association between a given set of anchor points and the motion sensor data associated with a user's trajectory. Correspondingly, the retail venue may have access to one or more sets of anchor points from sales records as well as one or more user trajectories, but not have information for matching them. While some grouping may be performed on the basis of the time stamps associated with the motion sensor data and the anchor point sets, it is to be expected within any given window of time, there may be multiple trajectories and multiple anchor point sets. Therefore, the techniques of this disclosure are directed to assigning a set of anchor points to a trajectory of a portable device. As will be described in the following materials, these techniques may be applied when any number of trajectories are available and when any number of anchor point sets are available, even if they are different numbers.

SUMMARY

As will be described in detail below, this disclosure includes a method for assigning a set of anchor points to a trajectory of a portable device. The method may involve obtaining a trajectory for the portable device for a first period of time, obtaining point of sale information overlapping the first period of time, wherein the point of sale information may involve at least one anchor point set, scoring each anchor point set in relation to the trajectory and assigning an anchor point set to the trajectory based at least in part on the scoring of each anchor point set.

This disclosure also includes a system for assigning a set of anchor points to a trajectory of a portable device. The system may include a portable device having an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs, and remote processing resources configured to receive the information from the portable device and having a processor configured to implement an assignment module to obtain a trajectory for the portable device for the first period of time, obtain point of sale information overlapping the first period of time, wherein the point of sale information comprises at least one anchor point set, score each anchor point set in relation to the trajectory and assign an anchor point set to the trajectory based at least in part on the scoring of each anchor point set.

This disclosure also includes a server for assigning an anchor point set to a trajectory of a portable device that may include processing resources configured to implement an assignment module to obtain a trajectory for the portable device for a first period of time, obtain point of sale information overlapping the first period of time, wherein the point of sale information comprises at least one anchor point set, score each anchor point set in relation to the trajectory and assign an anchor point set to the trajectory based at least in part on the scoring of each anchor point set.

DETAILED DESCRIPTION

Figure 1:
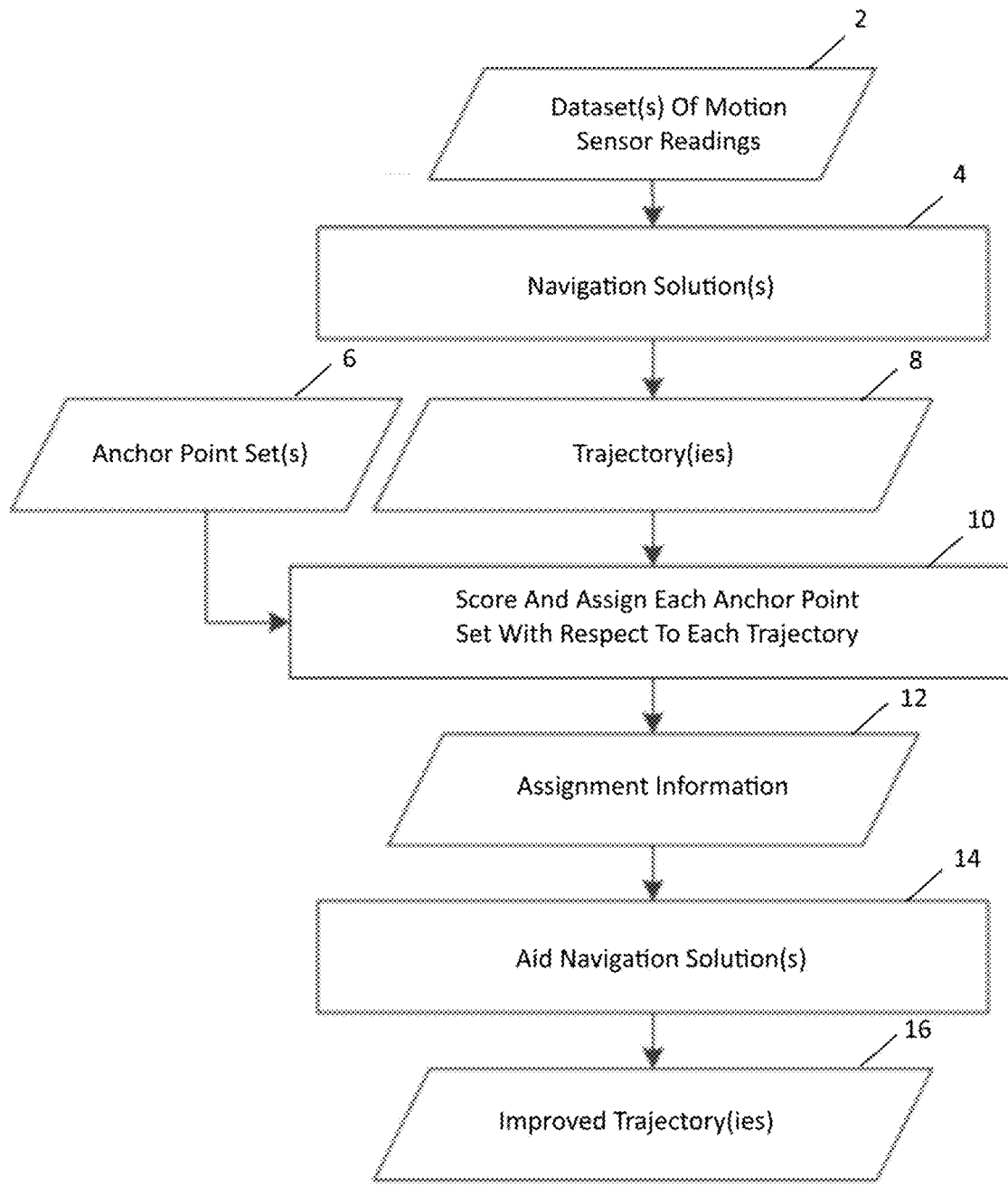
FIG. 1 is a schematic representation of a routine for assigning an anchor point set to a trajectory of a portable device according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

The techniques of this disclosure are directed to navigation solutions for a portable device that may be associated with a platform that transports the device. The platform may be the user, as in the example of a smartphone being carried as a user walks, runs, swims or otherwise undergoes locomotion. The platform may also be considered a vehicle or vessel that conveys the user and/or the portable device. In some embodiments, the platform may be a shopping cart or other aid associated with retail transactions. To illustrate, the portable device may be incorporated into the shopping cart itself or may be carried in the shopping cart, either loose or contained within another carrier, such as a purse or the like. Although the portable device generally maybe transported or conveyed in the direction of movement of the platform, its orientation may not be constrained. Returning to the example of the smartphone, it may be held in the user's hand and employed in a variety of orientations or carried in a pocket, holster, bag or other manners. In other examples, the portable device may be strapped to the platform, such as with a vehicle mount, or may be non-strapped. When non-strapped, the mobility of the device may be constrained or unconstrained within the platform and as a result, circumstances may exist such that the device can be tilted to any orientation with respect to the user or platform.

As an illustration only and without limitation, a user may be carrying a portable device while traversing a venue, such as shopping within a store. During this time, the portable device may derive a navigation solution comprising information about the position, orientation and or movement of the portable device of multiple epochs, thereby representing the trajectory of the user through the store. In one aspect, the portable device may use any suitable real-time technique to generate such navigation solution, including an inertial navigation routine employing dead reckoning, a reference-based location service utilizing a source of absolute navigation information, a location beaconing system or any other suitable technique, or combinations thereof. Although of substantial benefit, these real-time solution may nonetheless suffer from inaccuracies or limitations. Again without limitation, an inertial dead reckoning system may be subject to drift over time due to the characteristics of currently-employed sensors or a source of absolute navigation information such as a global navigation satellite system (GNSS) may suffer from poor reception in indoor environments. By employing the techniques of this disclosure, an anchor point set, such as from point of sale information, may be assigned to the trajectory. In turn, the anchor points may be used as absolute information or as an absolute position update to a sensor-based navigation solution or to a map-matching solution. The anchor point set may also be used to suggest possible routes of the trajectory or to segment the trajectory into more manageable portions between known positions established by the anchor points.

A flow chart outlining the techniques of this disclosure is depicted in FIG. 1. In this disclosure, operations or processes are designated with rectangles while inputs or outputs are designated with parallelograms. Beginning with 2, one or more datasets of readings from motion sensors, corresponding to one or more trajectories, may be obtained. By employing dead reckoning techniques or other suitable methods, navigation solutions may be derived in 4, from which one or more trajectories may be extracted in 6. A single trajectory may represent the path of a portable device through a venue over a given time, while multiple trajectories may represent separate paths associated with a single portable device or may represent any number of portable devices. Constructing each trajectory may involve any desired operation or combination of operations including forward processing, backward processing, forward and backward processing, smoothing, backward smoothing, multi pass processing and map matching. In 8, one or more sets of anchor points may be obtained, such as from point of sale information. The anchor point sets may be identified, at least in part, as those that overlap the period of time associated with the one or more trajectories. Each anchor point set may be scored with respect to each trajectory in 10, with the scores used to make assignments between anchor point sets and trajectories. Suitable techniques for scoring an anchor point set are described in further detail below. Based on the scoring information, each trajectory may be assigned a single, unique anchor point set, as also described below. If desired, an anchor point set may be assigned to a trajectory only if the score exceeds a suitable threshold, such as when only a single anchor point set and a single trajectory are provided. In such embodiments, the technique serves to validate the association between the anchor point set and the trajectory. Information of assignment of anchor point sets to trajectories are output in 12. One or more of the assigned anchor point sets may be used to aid one or more navigation solutions of the trajectories in 14, such as by providing an absolute position information update. Correspondingly, the aided navigation solution(s) may be used to generate an improved trajectory(ies) in 16.

Figure 2:
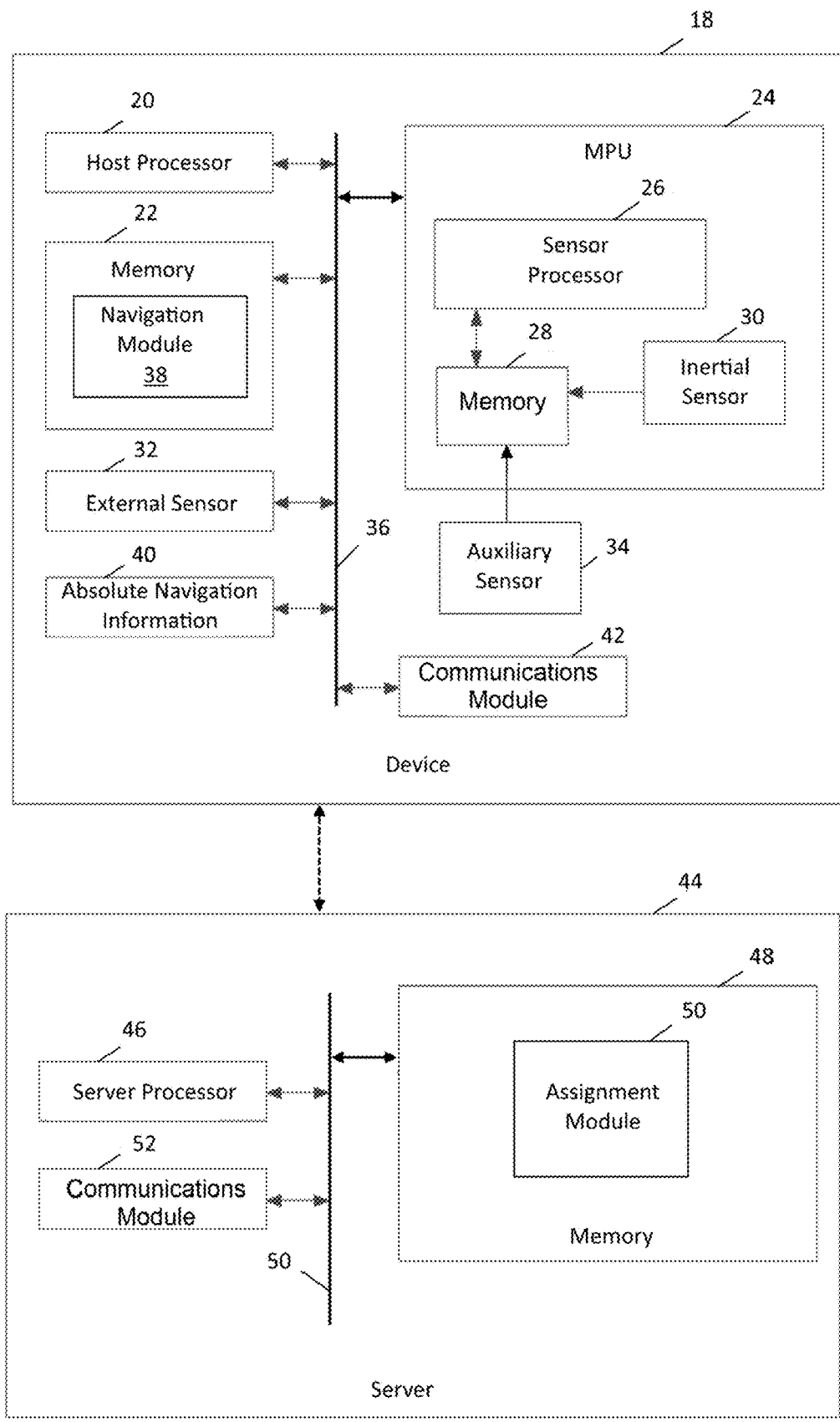
FIG. 2 is a schematic representation of functional blocks of a system for ordering anchor points according to an embodiment.

One representative system for assigning anchor point sets is schematically depicted in FIG. 2, with portable device 18 represented by high level schematic blocks. As will be appreciated, device 18 may be implemented as a device or apparatus, such as a handheld device that can be moved in space by a user and its motion, location and/or orientation in space therefore sensed. For example, such a handheld device may be a mobile phone (e.g., smartphone, cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices.

As shown, device 18 includes a host processor 20, which may be one or more microprocessors, central processing units (CPUs), or other processors to run software programs, which may be stored in memory 22, associated with the functions of device 18. Multiple layers of software can be provided in memory 22, which may be any combination of computer readable medium such as electronic memory or other storage medium such as hard disk, optical disk, etc., for use with the host processor 20. For example, an operating system layer can be provided for device 18 to control and manage system resources in real time, enable functions of application software and other layers, and interface application programs with other software and functions of device 18. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 18, and in some of those embodiments, multiple applications can run simultaneously.

Device 18 includes at least one sensor assembly, as shown here in the form of integrated motion processing unit (MPU™) 24 featuring sensor processor 26, memory 28 and inertial sensor 30. Memory 28 may store algorithms, routines or other instructions for processing data output by inertial sensor 30 and/or other sensors as described below using logic or controllers of sensor processor 26, as well as storing raw data and/or motion data output by inertial sensor 30 or other sensors. Inertial sensor 30 may be one or more sensors for measuring motion of device 18 in space. Depending on the configuration, MPU 24 measures one or more axes of rotation and/or one or more axes of acceleration of the device. In one embodiment, inertial sensor 30 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 26, or other processing resources of device 18, combines data from inertial sensor 30 to provide a six axis determination of motion. As desired, inertial sensor 30 may be implemented using Micro Electro Mechanical System (MEMS) to be integrated with MPU 24 in a single package. Exemplary details regarding suitable configurations of host processor 20 and MPU 24 may be found in co-pending, commonly owned U.S. patent application Ser. No. 11/774,488, filed Jul. 6, 2007, and Ser. No. 12/106,921, filed Apr. 11, 2008, which are hereby incorporated by reference in their entirety. Suitable implementations for MPU 24 in device 18 are available from InvenSense, Inc. of Sunnyvale, Calif.

Alternatively or in addition, device 18 may implement a sensor assembly in the form of external sensor 32. This is optional and not required in all embodiments. External sensor may represent one or more sensors as described above, such as an accelerometer and/or a gyroscope, which output data for use in deriving a navigation solution. As used herein, "external" means a sensor that is not integrated with MPU 24 and may be remote or local to device 18. Also alternatively or in addition, MPU 24 may receive data from an auxiliary sensor 34 configured to measure one or more aspects about the environment surrounding device 18. This is optional and not required in all embodiments. For example, a barometer and/or a magnetometer may be used to refine position determinations made using inertial sensor 30. In one embodiment, auxiliary sensor 34 may include a magnetometer measuring along three orthogonal axes and output data to be fused with the gyroscope and accelerometer inertial sensor data to provide a nine axis determination of motion. In another embodiment, auxiliary sensor 34 may also include a barometer to provide an altitude determination that may be fused with the other sensor data to provide a ten axis determination of motion. Although described in the context of one or more sensors being MEMS based, the techniques of this disclosure may be applied to any sensor design or implementation.

In the embodiment shown, host processor 20, memory 22, MPU 24 and other components of device 18 may be coupled through bus 36, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 18, such as by using a dedicated bus between host processor 20 and memory 22.

In one aspect, the various operations of this disclosure used to derive a navigation solution for portable device 18 may be implemented through navigation module 38 as a set of suitable instructions stored in memory 22 that may be read and executed by host processor 20. Navigation module 38 may employ a reference-based strategy, a self-contained strategy, or any combination of strategies to provide any desired degree of location awareness capabilities. For example, navigation module 38 may employ inertial navigation techniques utilizing sensor data, such as from inertial sensor 30, external sensor 32 and/or auxiliary sensor 34, as obtained for a current sensor epoch to derive a navigation solution for that epoch. Such techniques may involve dead reckoning or the like, and may determine an orientation for device 18, including values such as any roll, pitch, and azimuth (heading) angles. The navigation solutions derived by navigation module 38 represent contemporaneous determinations of position information for portable device 18. Although some transmission, some possible buffering, and processing time may be required, the results are at least near real time (there could be some possible latencies) and may use any information available up until the time the navigation solution is derived. Still further, navigation module 38 may also be configured to determine a motion mode that indicates the user's motion patterns, which may include without limitation, walking, driving, running, going up/down stairs, riding an elevator, walking/standing on an escalator, and other similar motion patterns. In some embodiments, navigation module 38 may employ a real-time map matching routine to aid the derivation of navigation solutions in a causal manner.

Navigation module 38 may also use a source of absolute navigation information 40, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Navigation module 38 may also be configured to use information from a wireless communication protocol to provide a position determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. Further, portable device 18 may also have a communications module 42 for transmitting and/or receiving information, including navigation solutions derived by navigation module 38.

Multiple layers of software may be employed as desired and stored in any combination of memory 22, memory 28, or other suitable location. For example, a motion algorithm layer can provide motion algorithms that provide lower-level processing for raw sensor data provided from the motion sensors and other sensors. A sensor device driver layer may provide a software interface to the hardware sensors of device 18. Further, a suitable application program interface (API) may be provided to facilitate communication between host processor 20 and MPU 24, for example, to transmit desired sensor processing tasks.

In this exemplary system, portable device 18 communicates raw sensor data or navigation solutions derived for a plurality of sensor epochs over a first period of time to server 44. Subsequent to the first period of time, server 44 may then receive anchor points associated with point of sale information and utilize the techniques of this disclosure to order the anchor points, based at least in part on a trajectory determined for portable device 18, either as determined by navigation module 38 or by server 44 as described below. Notably, in embodiments where portable device 18 transmits raw sensor data to server 44, navigation module 38 may be optional as no position determination need be made locally. One suitable architecture of server 44 is depicted using high level schematic blocks in FIG. 3, and may include server processor 46 that is in communication with memory 48 over bus 50. As will be described in further detail below, server processor 46 may execute instructions stored in memory 48 that are represented as functional blocks, including assignment module 50, which may perform the operations described in this disclosure to assign anchor point sets to trajectories.

Server 44 may also include a communications module 52 to receive raw sensor data or navigation solutions for portable device 18 derived by navigation module 38. Communications module 52 may also receive point of sale information, such as items purchased by the user and the corresponding location of those items in the retail venue. Communications involving portable device 18 and server 44 may employ any suitable protocol. For example, a shorter range, low power communication protocol such as BLUETOOTH®, ZigBee®, ANT or a wired connection may be used or a longer range communication protocol, such as a transmission control protocol, internet protocol (TCP/IP) packet-based communication, accessed using a wireless local area network (WLAN), cell phone protocol or the like may be used. In general, the system depicted in FIG. 3 may embody aspects of a networked or distributed computing environment. Portable device 18 and server 44 may communicate either directly or indirectly, such as through multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As noted, portable device 18 may derive navigation solutions and server 44 may obtain anchor points from point of sale information and order those anchor points. However, any or all of the functions described as being performed may be performed by any number of discrete devices in communication with each other, or may be performed by portable device 18 itself in other suitable system architectures. For example, navigation module 38 may be configured to obtain anchor points from point of sale information and assign anchor point sets to trajectories by performing the functions associated with assignment module 50. Accordingly, it should be appreciated that any suitable division of processing resources may be employed whether within one device or among a plurality of devices. Further, aspects implemented in software may include but are not limited to, application software, firmware, resident software, microcode, etc., and may take the form of a computer program product accessible from a computer-usable or computer-readable medium providing program code for use by or in connection with a computer or any instruction execution system, such as host processor 20, sensor processor 26, server processor 46, a dedicated processor or any other processing resources of portable device 18, server 44 or other remote processing resources, or may be implemented using any desired combination of software, hardware and firmware.

In one aspect, scoring each anchor point set may involve cumulating distances between a known location of each anchor point of the anchor point set and the trajectory.

In one aspect, the trajectory may be decomposed into segments by characterizing turns of the trajectory, wherein scoring each anchor point set may involve cumulating distances between a known location of each anchor point of the anchor point set and a closest segment of the trajectory. Each turn may have a start and an end and the distance traveled between a pair of sequential turns may be a distance between the end of a first turn and the start of a subsequent turn.

Characterizing turns of the trajectory may involve identifying pairs of sequential turns and a distance traveled between each pair of sequential turns. The distance traveled between a pair of sequential turns may be determined based at least in part on step length. Characterizing turns of the trajectory may also involve determining a link for each pair of sequential turns, wherein the link may involve a portion of the trajectory having the distance traveled between the pair of sequential turns and a heading. A turn may also be identified based at least in part on a rate of heading change of the portable device exceeding a threshold. Heading information may be filtered before identifying a turn. The start of the turn may be determined when the rate of heading change exceeds the threshold and the end of the turn may be determined when the rate of heading change falls below the threshold. Further, identifying a turn may be based at least in part on a detected fidgeting period and a change of heading during the fidgeting period. A start of the turn may be determined when the fidgeting period begins and an end of the turn may be determined when the fidgeting period ends. Identifying a turn may be based at least in part on determining an angle formed by adjacent segments of the trajectory exceeds a threshold.

In one aspect, decomposing the trajectory into segments further may involve identifying a floor change.

In one aspect, the point of sale information may involve a single anchor point set, further comprising assigning the single anchor point set to the trajectory when scoring of the anchor point set exceeds a threshold.

In one aspect, the point of sale information may involve a plurality of anchor point sets, further comprising assigning the anchor point set having a highest score to the trajectory.

In one aspect, the point of sale information may involve a plurality of anchor point sets, such that a plurality of trajectories may be obtained, wherein each trajectory may be for one or more portable devices for the first period of time, each anchor point set may be scored in relation to each trajectory and at least some of the anchor point sets may be uniquely assigned to at least some of the trajectories based at least in part on the scoring of each anchor point set. There may be more trajectories than anchor point sets and each anchor point set may be assigned to a different trajectory based at least in part on the scoring of each anchor point set and any remaining trajectories are unassigned. Alternatively, there may be more anchor point sets than trajectories and each trajectory may be assigned a different anchor point set based at least in part on the scoring of each anchor point set and any remaining anchor point sets are unassigned.

In one aspect, uniquely assigning at least some of the anchor point sets to at least some of the trajectories may involve assigning an anchor point set having a highest score with regard to each trajectory to that trajectory.

In one aspect, uniquely assigning at least some of the anchor point sets to at least some of the trajectories may involve assigning an anchor point set having a next highest score with regard to a trajectory to that trajectory if one anchor point set has a highest score with regard to more than one trajectory. A trajectory to be assigned the anchor point set having the next highest score may be based at least in part on comparing differences between a highest score and a next highest score for trajectories in which one anchor point set has the highest score. The anchor point set with the highest score may be assigned to a trajectory having a lower next highest score when the differences do not exceed a threshold. The anchor point set with the highest score may be assigned to a trajectory having a greater difference between a highest score and a next highest score when the differences exceed a threshold.

In one aspect, the trajectory for the portable device may use sensor data for the portable device representing motion of the portable device at a plurality of epochs over the first period of time and the trajectory may be derived based at least in part on the sensor data, wherein the mobility of the portable device may be constrained or unconstrained within a platform and wherein the portable device may be tilted to any orientation. Deriving the trajectory may involve performing a forward processing operation over the first period of time. Deriving the trajectory may involve performing a backward processing operation over the first period of time. Deriving the trajectory may involve performing a forward processing operation and a backward processing operation over the first period of time. Deriving the trajectory may involve performing a forward processing operation, a backward processing operation over the first period of time, and a combination of the forward processing and backward processing. Deriving the trajectory may involve performing a smoothing operation over the first period of time. Deriving the trajectory may involve performing a backward smoothing operation over the first period of time. Deriving the trajectory may involve performing a multiple pass processing operation over the first period of time.

In one aspect, deriving the trajectory further may also involve obtaining map information for an area encompassing the trajectory and matching the trajectory to the map information. The map information may be transformed by extracting map entities. At least one foreground map entity may be clipped from a background entity. Clipping the background entity may define a traversable area. The map information may also be transformed by representing a map entity as a relatively complex polygon and decomposing the polygon into a plurality of relatively more simple polygons. The obtained map information may be transformed into a grid of connected traces and nodes. Transforming the obtained map may involve constructing a voronoi diagram. Each node may be equidistant from at least three map entities and wherein each trace may be equidistant from less than three map entities.

In one aspect, a navigation solution for the portable device may be updated based at least in part on the assigned anchor point set.

In one aspect, user analytics may be derived based at least in part on the assigned anchor point set. User analytics may also be derived based at least in part on the updated navigation solution.

This disclosure may also include a system, such as depicted and described with respect to FIG. 2, including a portable device and remote processing resources, such as a server. The portable device may have an integrated sensor assembly, configured to output sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs. The remote processing resources may be configured to receive the information from the portable device and may have a processor configured to implement an assignment module to obtain a trajectory for the portable device for the first period of time, obtain point of sale information overlapping the first period of time, wherein the point of sale information comprises at least one anchor point set, score each anchor point set in relation to the trajectory and assign an anchor point set to the trajectory based at least in part on the scoring of each anchor point set.

In one aspect, the information received by the remote processing resources may be sensor data for the portable device. The remote processing resources may have an assignment module that derives the trajectory based at least in part on the sensor data. Alternatively or in addition, the portable device may have a navigation module configured to derive the trajectory based at least in part on the sensor data at the plurality of epochs and may transmit the derived trajectory using a communications module. The sensor assembly of the portable device may include an accelerometer and a gyroscope. The sensor assembly of the portable device may include an inertial sensor implemented as a Micro Electro Mechanical System (MEMS). The point of sale information may include a plurality of anchor point sets and the assignment module of the remote processing resources may obtain a plurality of trajectories, wherein each trajectory is for one or more portable devices for the first period of time, score each anchor point set in relation to each trajectory and uniquely assign at least some of the anchor point sets to at least some of the trajectories based at least in part on the scoring of each anchor point set.

In one aspect, the remote processing resources may receive sensor data for the one or more portable devices for the plurality of trajectories and the assignment module may derive each of the plurality of trajectories based at least in part on the respective sensor data.

In one aspect, the remote processing resources may receive the plurality of trajectories for the one or more portable devices based at least in part on the respective sensor data from the one or more portable devices.

In some embodiments, the one or more of the operations associated with scoring and assigning anchor point sets may be performed by a server. The server may have processing resources configured to implement an assignment module to obtain a trajectory for the portable device for a first period of time, obtain point of sale information overlapping the first period of time, wherein the point of sale information comprises at least one anchor point set, score each anchor point set in relation to the trajectory and assign an anchor point set to the trajectory based at least in part on the scoring of each anchor point set.

In one aspect, the server may receive sensor data for the portable device and wherein the assignment module is further configured to derive the trajectory based at least in part on the sensor data.

In one aspect, the server may receive the trajectory based at least in part on the sensor data from the portable device.

In one aspect, the point of sale information may include a plurality of anchor point sets, such that the assignment module obtains a plurality of trajectories, wherein each trajectory is for one or more portable devices for the first period of time, scores each anchor point set in relation to each trajectory and uniquely assigns at least some of the anchor point sets to at least some of the trajectories based at least in part on the scoring of each anchor point set.

In one aspect, the server may receive sensor data for the one or more portable devices for the plurality of trajectories and the assignment module may derive each of the plurality of trajectories based at least in part on the respective sensor data.

In one aspect, the server may receive the plurality of trajectories for the one or more portable devices based at least in part on the respective sensor data from the one or more portable devices.

EXAMPLES

As noted above, the techniques of this disclosure involve assigning each of one or more trajectories with a unique anchor point set. Although each trajectory may be obtained in any suitable manner, in some embodiments a trajectory may be constructed from sensor data. Accordingly, sensor data may be obtained for a plurality of epochs over a given time period, such as from inertial sensor 30 and/or external sensor 32, for the portable device 18. Using the sensor data, navigation module 38 may derive navigation solutions at each sensor epoch to form the trajectory locally. These operations may also be performed using remote processing resources, such as server 44. For example, the derivation of navigation solutions for each sensor epoch may be performed by navigation module 38 at portable device 16 or may be performed at server 44 using the raw sensor data for each sensor epoch as transmitted by portable device 18. In some embodiments, the navigation solutions may be based at least in part on map matching. A map may be obtained for a venue encompassing the trajectory, and may be a grid map, a geometric map or a combination. Map information may also be processed or transformed into a suitable grid and/or geometric map as warranted. Using any suitable technique, the map information may be used to constrain or otherwise aid the navigation solutions, such as by map matching.

Figure 3:
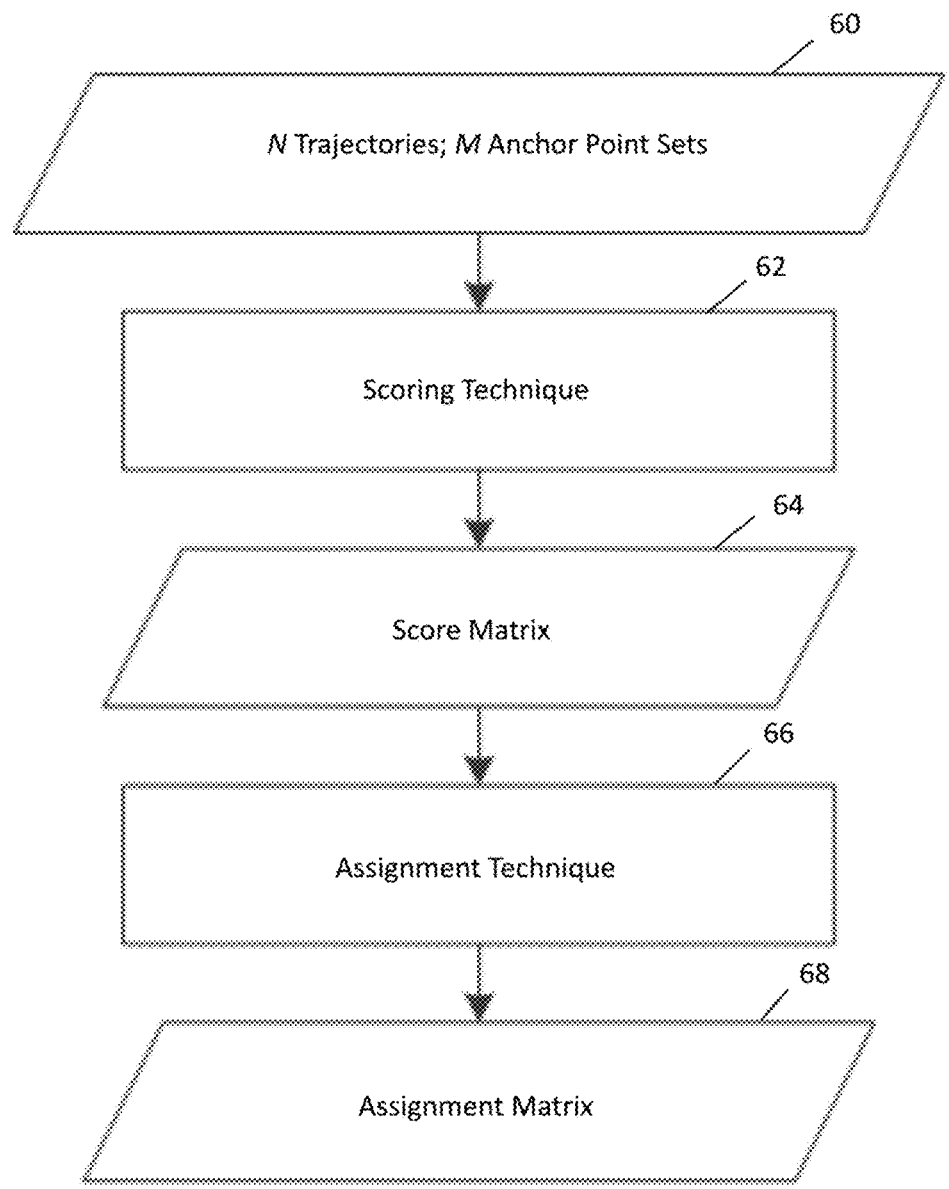
FIG. 3 is a schematic representation of a routine for scoring and assigning anchor point sets to trajectories according to an embodiment

The following examples describe suitable operations for scoring each anchor point set with respect to a trajectory. A goal of the scoring operation is to quantify how closely related the trajectory is to each anchor point set. Correspondingly, the score information may then be used to assign each trajectory a unique anchor point set. An example flow of operations is schematically depicted in FIG. 3. In 60, M anchor point sets may be provided for matching to N trajectories. Assignment module may implement a suitable scoring technique, such as those described below, in 62 and output an N×M score matrix in 64, so that each anchor point set has a score for each trajectory. As will be appreciated, a matrix is convenient way to present the information, but the techniques of this disclosure should not be considered to be limited in this respect. Correspondingly, assignment module 50 may then apply an assignment operation based on the scores in 66 and output a matrix assignment each trajectory to an anchor point set in 68. Again, although an assignment matrix is a convenient representation of the anchor point assignments, it should not be considered limiting. The assignment techniques may be adapted to accommodate situations when the number of trajectories may not equal the number of anchor point sets, (i.e., M≠N), or when one anchor point set receives the highest score for a plurality of trajectories.

Figure 4:
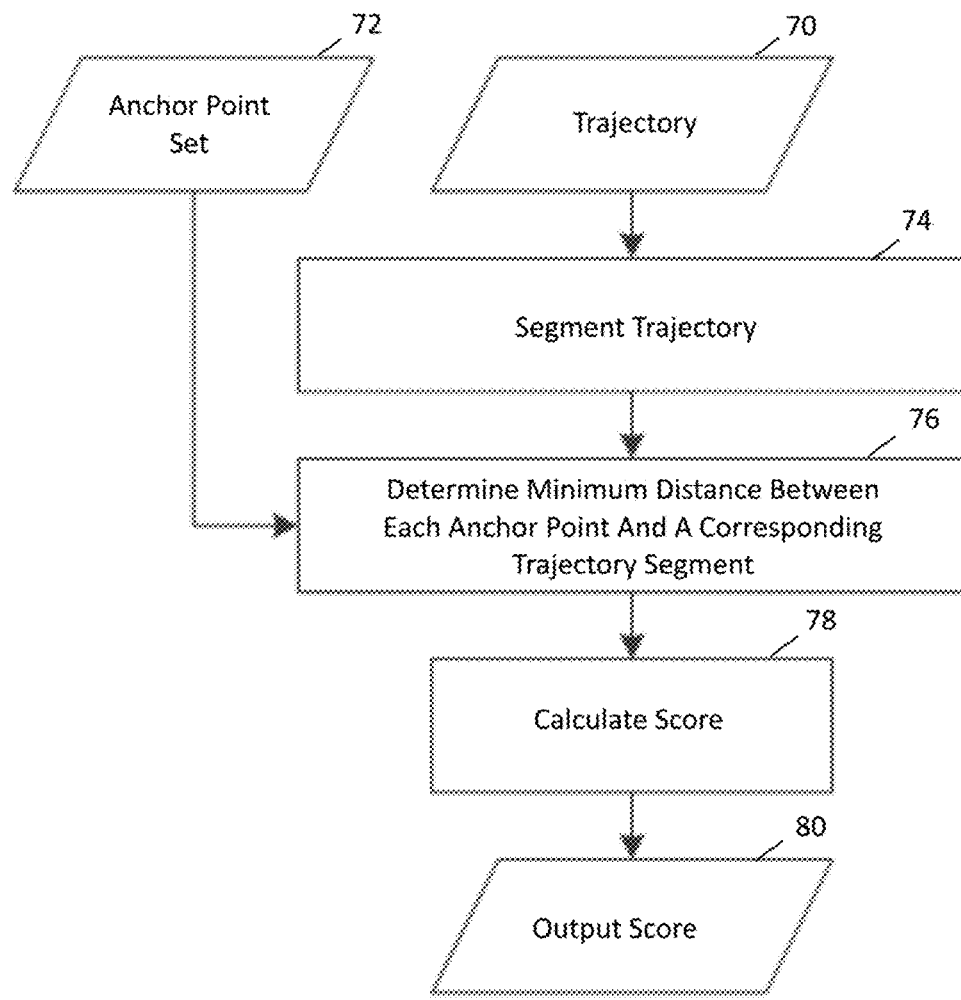
FIG. 4 is a schematic representation of a routine for scoring an anchor point set with respect to a trajectory of a portable device according to an embodiment.
Figure 5:
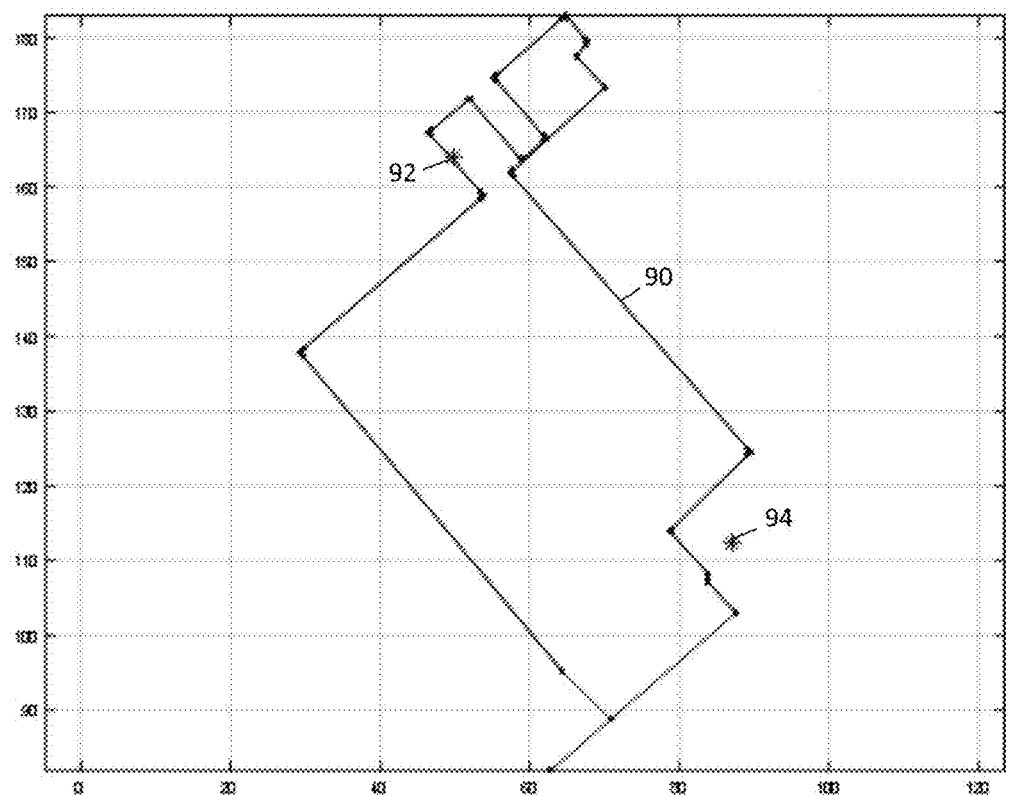
FIG. 5 is a schematic representation of trajectory and a set of anchor points according to an embodiment.

To help illustrate the principle operations that may be performed by assignment module 50 to score anchor point sets, a representative flow chart is depicted in FIG. 4. Beginning with 70, a trajectory is chosen. If multiple trajectories are provided, this routine is performed for each. In 72, the anchor point sets are provided and the routine is performed for each anchor point set. In 74, the trajectory is segmented based on floor change, direction change and turns as described below and relevant parameters calculated, such as segment slope. In 76, the distance between each anchor point within the anchor point set and the closest trajectory segment is determined. The minimum distances are cumulated in 78 and used to output a score in 80 for the current anchor point set.

The scoring technique may be used to estimate the relation between each anchor point set and each trajectory and express the relation as a score quantity. Each epoch of a given trajectory may be defined in latitude, longitude, and height coordinate from the underlying navigation solutions. Other suitable parameters may be provided, including platform attitude or heading and floor number when dealing with venues encompassing multiple stories. As such, each trajectory epoch may be converted into Cartesian coordinates relative to the venue, with an initial point determined at the store start anchor point, such as an entrance. Further, each anchor point set may correspond to a list of items sold in a transaction, with each item being an anchor point having known location coordinates including latitude, longitude, and height. If desired, each anchor point may have a flag to indicate its floor number, again for multiple story venues. Correspondingly, each anchor point set may have anchor points corresponding to sold items as well as a start point and an end point. The start point may be an anchor point associated with the location where the user enters the store while the end point may be the checkout location at which the transaction is concluded. Since the start and end anchor points have an assumed direction, a heading value may be assigned. The Cartesian coordinates for the trajectory epochs and for the anchor points may be determined using Equation 1:

$$x = (\lambda - \lambda_o)(R_N - h_o)\cos(\lambda_o) \quad (1)$$

$$y = (\varphi - \varphi_o)(R_M - h_o)$$

where x and y are the Cartesian coordinates, $\lambda$ and $\varphi$ are the longitude and latitude coordinates, respectively, $\lambda_o$, $\varphi_o$, and $h_o$ are the initial longitude, initial latitude, and the initial height, respectively, and $R_N$ and $R_M$ are the radii of curvature.

Following conversion of the anchor points and trajectory epochs to Cartesian coordinates, floor number identification may be performed as warranted. A floor number for each trajectory epoch may be obtained based on height change detection or from any other methods. Identifying the relevant floor numbers may include assessing the different floors that the user has visited during the trajectory in the venue. The total number of floors may be counted to determine the minimum and maximum floor tags so that all possible floors in the range between the minimum and maximum are included.

Next, turns occurring within the trajectory may be identified, with each turn being associated with a change in direction. For example, platform heading values may be used to detect changes in user movement direction. For each trajectory epoch, the average heading of the previous window of epochs is compared to the average heading of the following window of epochs using Equation 2:

$$\text{Prev\_heading} = \frac{1}{L}\sum_{i=k-L-1}^{k-1} H_i \quad (2)$$

$$\text{Post\_heading} = \frac{1}{L}\sum_{i=k+1}^{k+L+1} H_i$$

where H is the heading value, k is the index of the current point and L is the length of the window. The epoch may be considered a turning point if the difference between the previous heading and the post heading is greater than an appropriate heading threshold and correspondingly may be assigned a turn point index. As noted, floor change also may be used to segment the trajectory, by inserting a turn point index. Additional details regarding turn identification are given below in the context of using map information to help construct the trajectory.

Correspondingly, the turn indices may be used in creating the trajectory segments, with each segment including a start point and end point. Each segment may be formed by sequential turn indices with a beginning and end. Further, suitable parameters may be calculated for each segment such as the corresponding floor number, the slope, slope of the perpendicular line, and the segment length. Segment slope may be calculated using Equation 3:

$$\text{seg\_slope} = (y_{end} - y_{start})/(x_{end} - x_{start}) \quad (3)$$

The perpendicular line of the segment may be obtained using Equation 4:

$$\text{seg\_line} = y_{start} - \text{seg\_slope}^* x_{start} \quad (4)$$

Segment length may be calculated using Equation 5:

$$\text{seg\_length} = \sqrt{(x_{end} - x_{start})^2 + (y_{end} - y_{start})^2} \quad (5)$$

Figure 6:
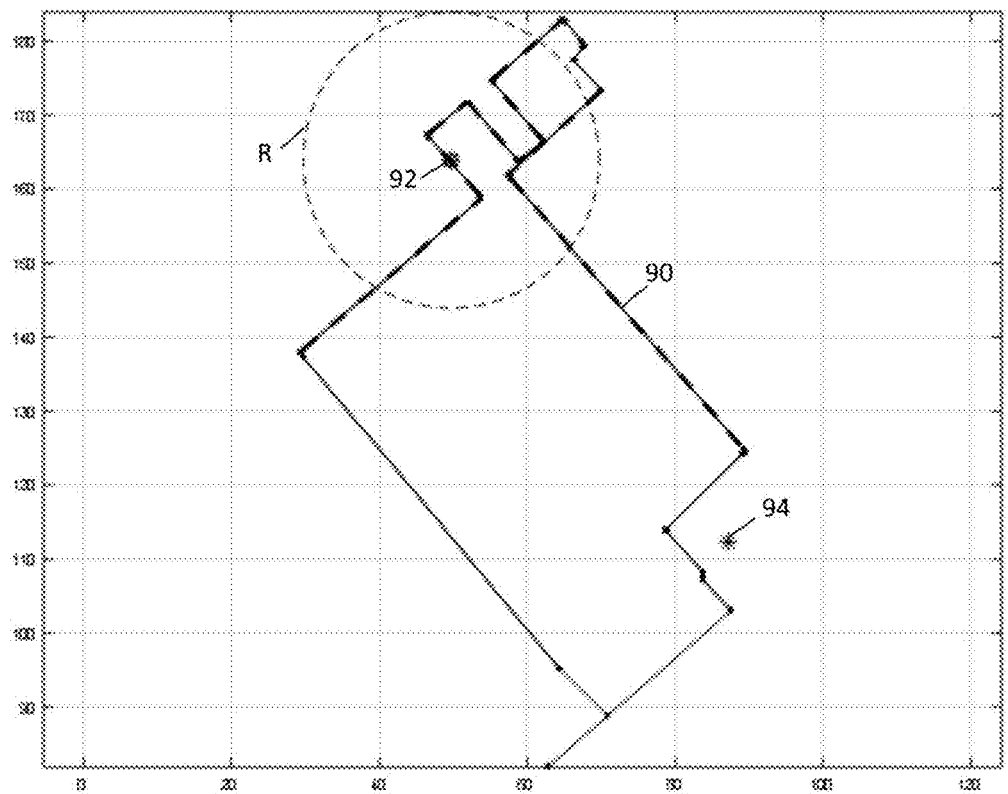
FIG. 6 is a schematic representation of a subset of trajectory segments within a range of an anchor point according to an embodiment.
Figure 7:
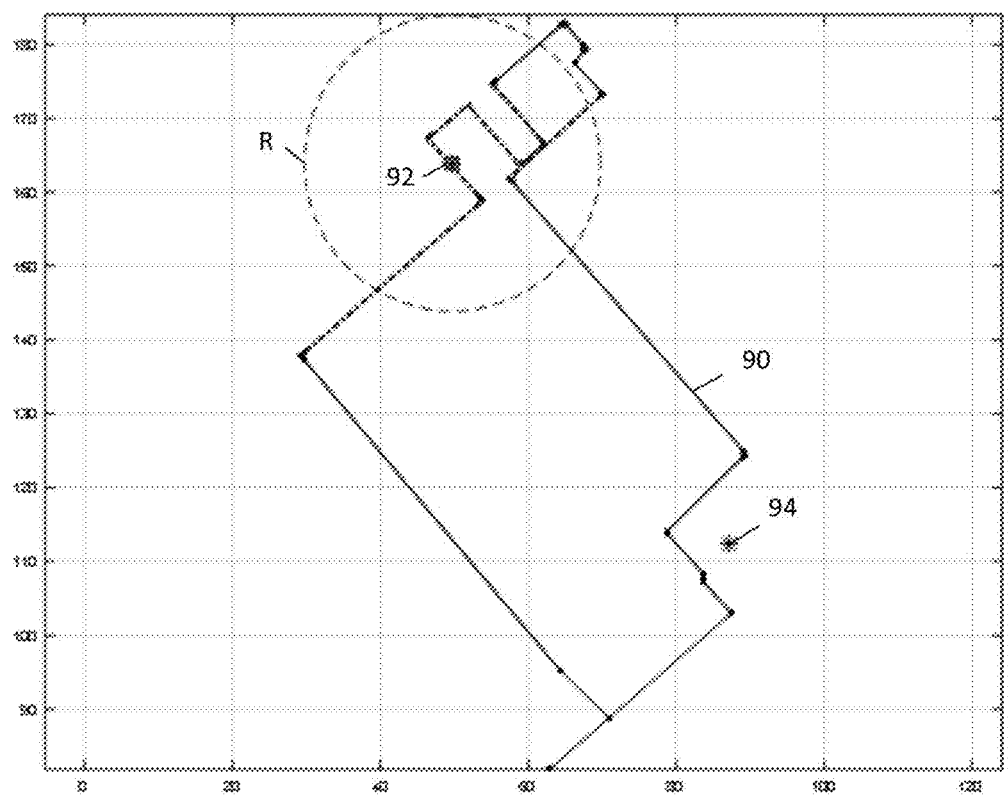
FIG. 7 is a schematic representation of a further subset of trajectory segments having a perpendicular intersection location related to an anchor point according to an embodiment.

These aspects are illustrated with respect to an exemplary trajectory in FIGS. 5-8. Beginning with FIG. 5, the trajectory is indicated by trace 90 and two anchor points, anchor point 92 and anchor point 94, are shown. A minimum distance is calculated between each anchor point and its closest trajectory segment. To facilitate calculation, one or more filtering operations may be performed to reduce the number of trajectory segments that are assessed. For example, when a floor change occurs, a window of time may be set as a transition segment around the identified floor change and the segment may be excluded from the trajectory segments list. Further, the entire set of segments corresponding to the trajectory may be filtered to select those segments that are located on the same floor as the anchor point currently being assessed, forming a new set of segments called Segments_Floor. For this illustration, the set of anchor points and the trajectory are located on the same floor, so the entire trajectory is shown. In turn, Segments_Floor may be filtered to select segments that have a start point or end point or both within a desired range around the current anchor point, anchor point 92 in this example, to generate a new set of segments called Segments_Range. As shown in FIG. 6, the trajectory segments belonging to Segments_Range are indicated with dashed lines and all may be seen to have at least the start or the end of the segment located in the range of circle R. The performance of this routine may be adjusted by selecting an appropriate value of R to either increase or decrease the number of segments being processed.

Next, the perpendicular intersection point between the current anchor point and each segment in the group Segments_Range may be determined. For each segment in Segments_Range, the distances from the start point, Start Length and end point, End_Length to the located intersection point may be calculated. The group Segments_Range may be additionally filtered by selecting a subset of segments that have Start Length and End_Length less than a desired threshold, called Segments_Length and shown in FIG. 7 as the segments with dotted lines. The performance of this routine also may be adjusted by selecting a distance threshold to either increase or decrease the number of segments being processed. The relationship between the various subsets of trajectory segments is indicated by Equation 6:

$$\text{Segments\_Length} \subseteq \text{Segments\_Range} \subseteq \text{Segments\_Floor} \subseteq \text{Trajectory\_Segments} \quad (6)$$

Figure 8:
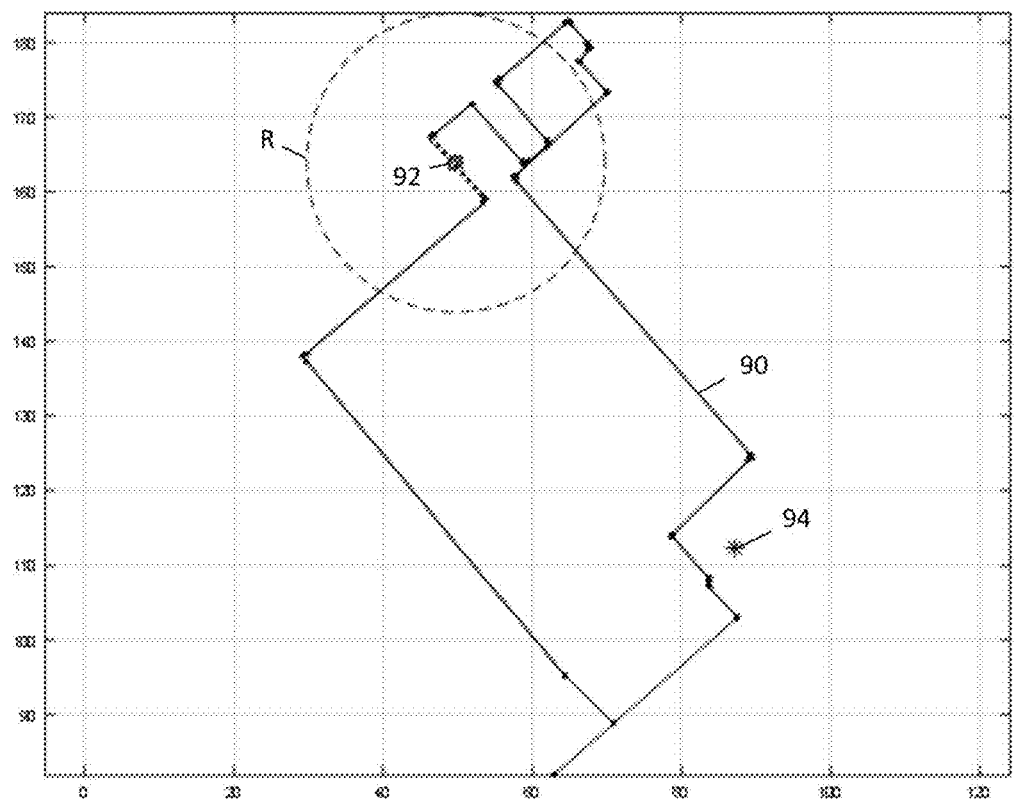
FIG. 8 is a schematic representation of a trajectory segment exhibiting a minimum distance to an anchor point according to an embodiment.

From this reduced subset of segments, Segments_Length, the closest segment to the current anchor point may be identified. As shown in FIG. 8, the closest segment of Segments_Length is designated with dashed lines. Correspondingly, the minimum distance to this segment may be calculated from the Cartesian coordinates of the anchor point and the perpendicular intersection point, such as by using Equation 5 as described above.

These above operations may be repeated for each anchor point within the anchor point set, with minimum distances calculated for each anchor point to their nearest trajectory segment. A score may be established for the anchor point set in any suitable manner that cumulates the calculated minimum distances and compensates for the number of anchor points used. One example is given by Equation 7:

$$\text{score} = \text{AP\_Number}/(\Sigma_{i=1}^{AP\_Number} \text{AP}_i - \text{min\_dist}) \quad (7)$$

where AP_Number is the total number of anchor points in the POS anchor point set. It should be appreciated that other equations may be employed to generate a score value that represents the minimum distance between the anchor points and their closest trajectory segments.

In some embodiments, these techniques may involve generating a scoring matrix, having dimensions N×M corresponding N trajectories and M anchor point sets. The result is matrix where the $ij^{th}$ element represents the score between the $i^{th}$ and the $j^{th}$ anchor point set. Correspondingly, each row in the scoring matrix represents the relation between one trajectory and all available anchor point sets.

Figure 9:
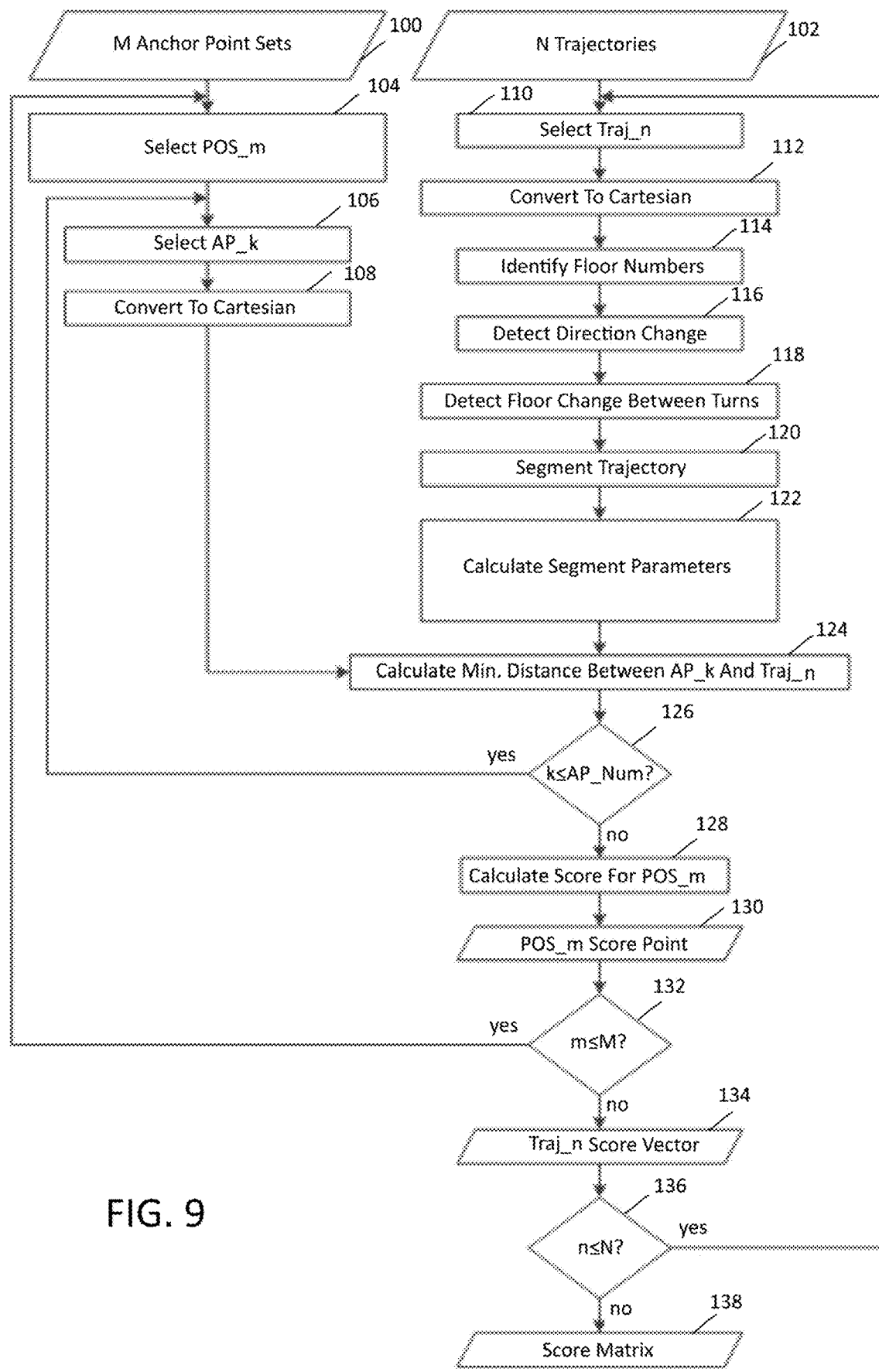
FIG. 9 is a schematic representation of routine for scoring anchor point sets according to an embodiment.

To help illustrate, one suitable scoring routine is schematically depicted in FIG. 9. Beginning with 100 and 102, assignment module 50 may receive M anchor point sets and N trajectories as inputs. To sequentially score each anchor point set against each trajectory, an anchor point set, POS_m, is selected from the M anchor point sets in 104. Then, for the selected POS_m, each anchor point, AP_k, is also sequentially selected in 106. As discussed, the known location of the anchor point may be converted to Cartesian coordinates, such as latitude and longitude in 108. Correspondingly, each trajectory is sequentially selected as Traj_n in 110 from the N trajectories and also converted to Cartesian coordinates in 112. If a floor change has occurred, the relevant floor numbers may be associated with Traj_n in 114 as discussed above. Next, in 116 turns may be identified by detecting direction change or any other suitable technique for identifying turns. In 118, it may be determined whether a change in floors occurred during a turn. Based on these determinations, and others if desired, Traj_n may be segmented by the identified turns and/or floor changes. Relevant parameters for one or more of the segments may be calculated in 122. Examples of segment parameters include floor number, slope, perpendicular line slope, and length.

With the selected AP_k and Traj_n, the minimum distance may be calculated in 124 as described above or by any other suitable technique. These operations may be performed for each of the M anchor point sets and N trajectories as follows. In 126 it may be determined a minimum distance has been calculated for each anchor point in an anchor point set by checking if k is less than the number of anchor points, AP_Num. If so, the routine may return to 106 for selection of the next anchor point. Otherwise, a score representing the minimum distance for each anchor point (AP_k) may be calculated for POS_m 128 and output in 130. Next, in 132 a check is performed to determine whether all anchor point sets have been scored for the current trajectory by comparing m to M. If m is less than or equal M, the routine may return to 104 for selection of the next POS_m and otherwise may progress to 134 to output a vector for Traj_n comprising the scores determined in 130 for each POS_m. Finally, in 136 a check is performed to determine whether all trajectories have been considered by comparing n to N. If n is less than or equal N, the routine returns to 110 for selection of the next Traj_n, and otherwise progresses to 138 to output the N×M score matrix that provides a score for each anchor point set with respect to each trajectory. Again, the information may be output in any other suitable format and should not be considered as being limited to a matrix.

Figure 10:
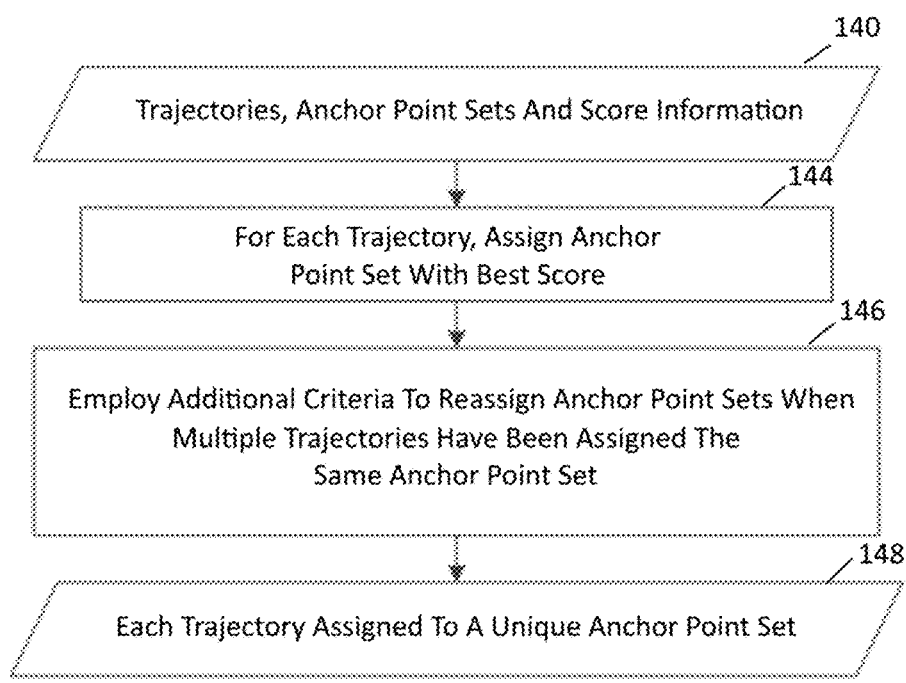
FIG. 10 is a schematic representation of routine for assigning anchor point sets according to an embodiment.

Next, assignment of an anchor point set to a trajectory may be performed using the scoring information, such as may be obtained as described above or in other suitable manners. Three different scenarios describe the possible relationship between the number of trajectories and the number of anchor point sets being assigned to them. First, a single trajectory and a single anchor point set may be provided. The score for this anchor point set may be computed as described above. If desired, the anchor point set may be assigned to the trajectory only if the score exceeds a threshold. Second, the number of trajectories may be less than or equal to the number of anchor point sets. Assignment in this scenario may involve matching the highest scoring anchor point sets to their corresponding trajectories, discarding any remaining anchor point sets. As will be appreciated, when there is only a single trajectory, it may simply be assigned the anchor point set with the best score. The third scenario exists when the number of trajectories is greater than the number of anchor point sets, such that the highest scoring anchor point sets are matched to their corresponding trajectories and any remaining trajectories discarded. An exemplary routine indicating operations that may be performed when assigning anchor point sets to trajectories is depicted in FIG. 10. As indicated in 140, inputs to the routine may include identifiers for each trajectory, such as Traj_n for 1 to N, and anchor point set, such as POS_m for 1 to M, and the score information, such as a score matrix as described above. In 142, each trajectory may be assigned an anchor point set which has the best score for that trajectory. In 144, additional criteria may be employed if one anchor point set has been assigned to multiple trajectories to reassign the anchor point sets until each trajectory has a unique anchor point set. Examples of suitable criteria for anchor point set reassignment are described in further detail below. The output of the routine is provided in 146 and comprises the trajectory identifiers, each with a matched anchor point set identifier.

Figure 11:
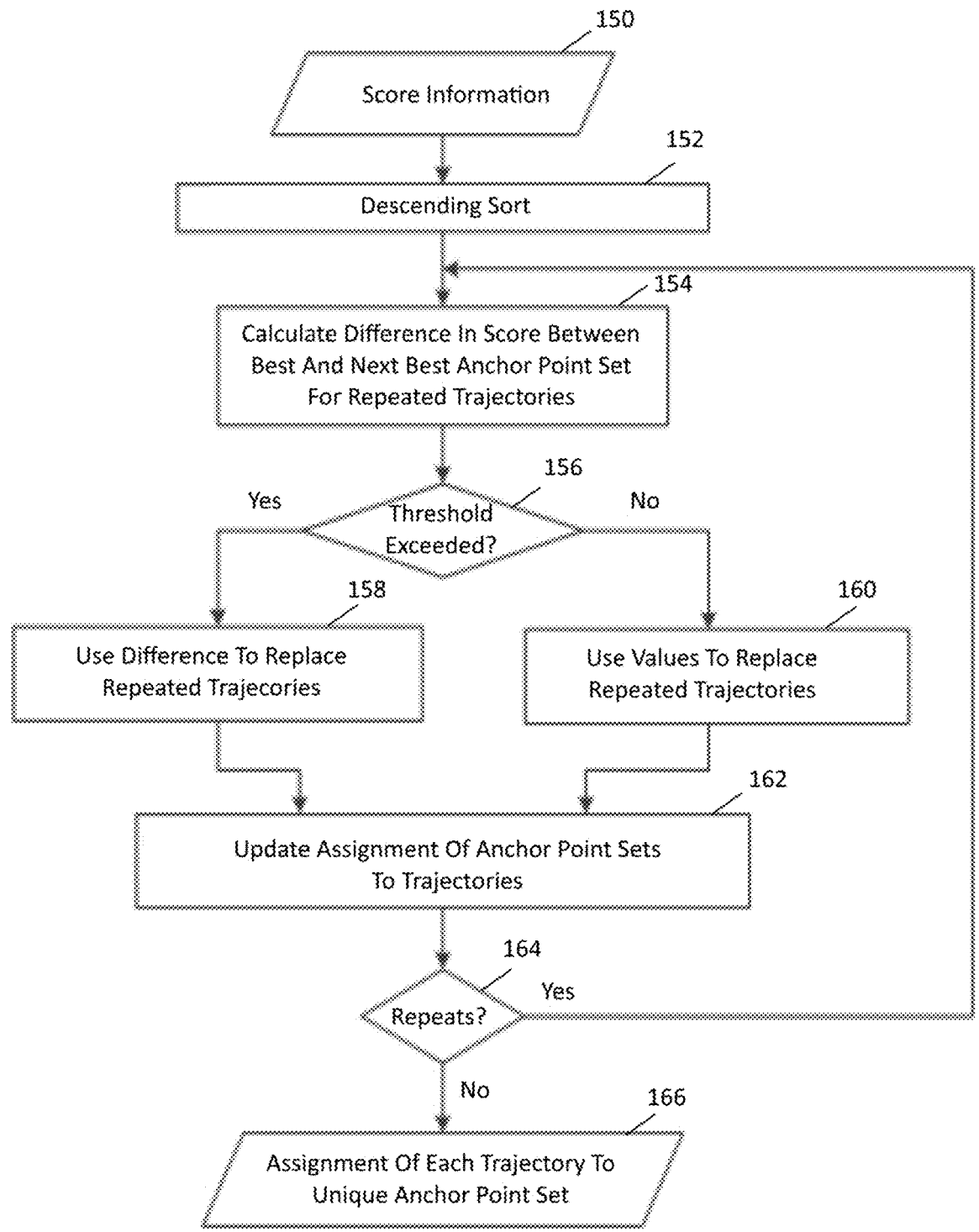
FIG. 11 is a schematic representation of routine for assigning anchor point sets using differences and values according to an embodiment.

A suitable technique for assigning anchor point sets to trajectories when one anchor point set is assigned to multiple trajectories is schematically represented by the flow chart shown in FIG. 11, indicating the operations that may be performed by assignment module 50. In the coming discussion and flowcharts, the term "repeated trajectories" refers to the multiple different trajectories that had the same anchor point set assigned to them. The routine begins in 150 by obtaining the score information for all trajectories and all anchor point sets. The scores for each trajectory may be sorted in descending order in 152. The result of 152 is a preliminary assignment with the anchor point set having the best score for each trajectory is assigned to that trajectory. In 154, assignment module 150 may calculate the difference in score between the anchor point set with the best score and the score of the next best anchor point set for repeated trajectories that have been preliminarily assigned the same anchor point set. The calculated difference may be compared to a threshold in 156. If the difference between the best score and the next best score for a given trajectory exceeds the threshold, the difference may be used to reassign the anchor point sets in 158. Otherwise, the score values may be used to reassign the anchor point sets in 160 when the difference between the best score and the next best score does not exceed the threshold. Based on the operations in 158 or 160, an updated assignment of the anchor points to trajectories may be made in 162. The routine then checks if any trajectories still have a repeated anchor point set in 164. If so, the flow returns to 154 to resolve the next repeat. Otherwise, the routine may continue to 166 and output the matches of trajectory to anchor point set as reassigned.

Figure 12:
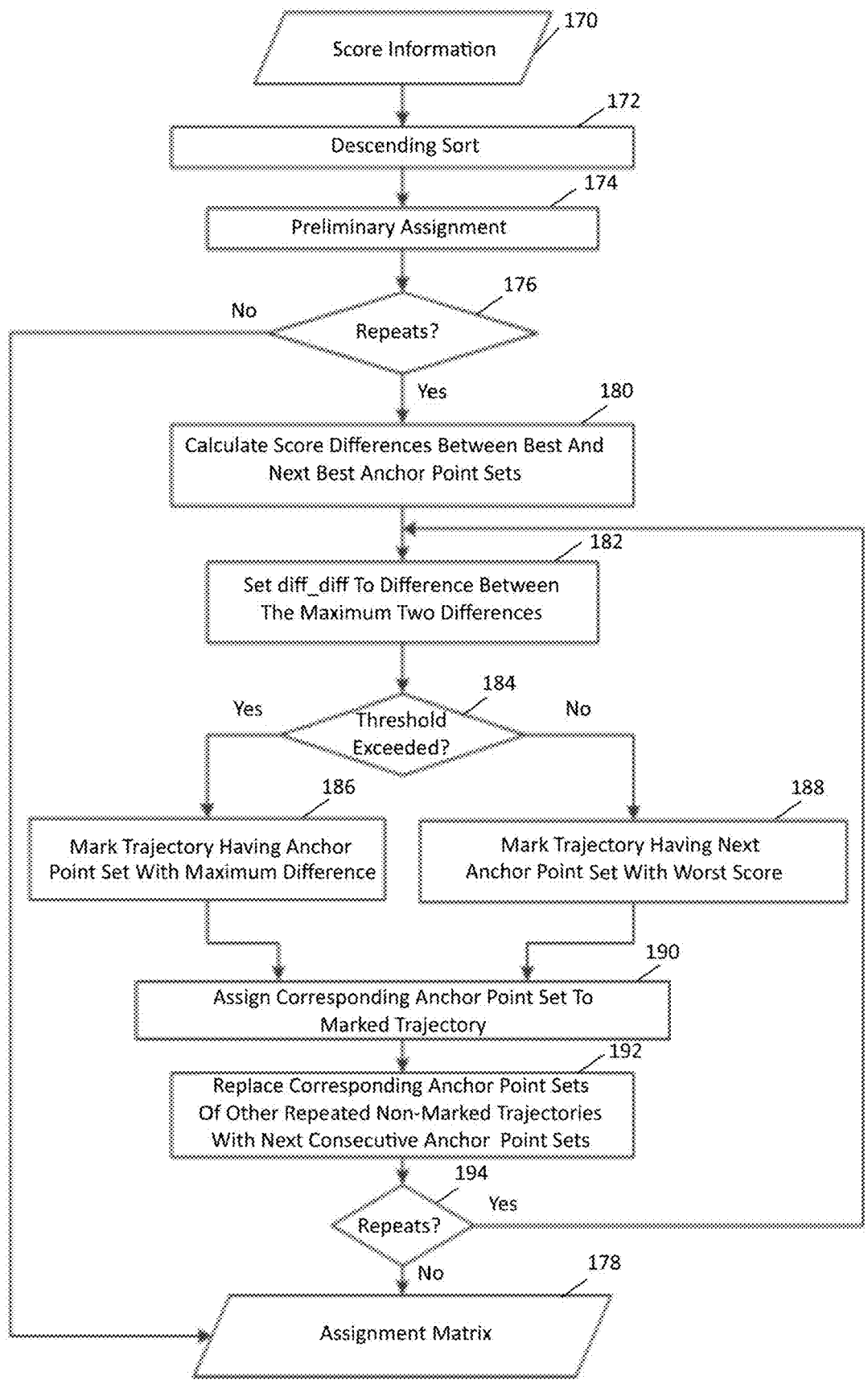
FIG. 12 is a schematic representation of routine for assigning anchor point sets using the differences between anchor point set scores according to an embodiment.

In one embodiment, additional aspects of the assignment technique performed by assignment module 50 may include the operations indicated in the flowchart shown in FIG. 12. The routine begins in 170 by obtaining the score information for all trajectories and all anchor point sets. The scores for each trajectory may be sorted in descending order in 172. A preliminary assignment is made using the sorting in 174, with the anchor point set having the best score assigned to each trajectory. In 176, assignment module 50 may determine whether any repeats exist in which the same anchor point set has been preliminarily assigned to more than one trajectory. If not, the routine completes in 178 by outputting the assignment established in 174, since each trajectory is associated with a unique anchor point set. As noted, when there is only a single trajectory, it may simply be assigned the anchor point set with the best score.

However, if there are repeated trajectories such that a given anchor point set has the best score for two or more trajectories (this anchor point set will be referred to as the corresponding anchor point set), the routine branches to 180 and the score differences between the best score and the next best score for the repeated trajectories is calculated. The difference between the maximum two differences, diff_diff, is calculated in 182 to decide which trajectory will retain the preliminarily assigned anchor point and which trajectories will be reassigned to anchor point sets having the next best score. The value of diff_diff is compared to preset threshold in 184. If the value of diff_diff is greater than the threshold, the trajectory having the maximum difference between the anchor point set with the best score and the anchor point set with the next best score may be marked to retain the preliminary assignment as indicated by 186. Otherwise, if the value of diff_diff is less than or equal to the threshold, the trajectory having the next anchor point set with the worst score in the preliminary assignment may be marked to retain the assignment in 188. Accordingly, in 190 the marked trajectory is assigned with the corresponding anchor point set. Then, the non-marked repeated trajectories (the other one(s) that was not marked) are assigned their corresponding next (consecutive) anchor point sets in 192. The routine then checks if any repeated trajectories still exist after completion of 190 and 192 in 194. If so, the flow returns to 182 to resolve the next repeat. Otherwise, the routine may continue to 178, as discussed above, to output the current assignments for the trajectories.

As discussed above, constructing a trajectory representing the user's travel through the venue from motion sensor data may in some embodiments be supplemented with map matching techniques when map information is available for the venue. Map information is processed to extract possible paths taken by the user and/or to constrain derived navigation solutions using the known characteristics of the physical environment through which the portable device is moving. Map information may initially be obtained from any suitable source, such as from on-line map service providers. As necessary, the map information may be processed into a form suitable for use, such as by forming a grid map, a geometric map or a combination. For example, the map information may be converted into an internal map data structure, where it may be saved into the local storage for future use without the overhead of downloading and processing it again if desired. Accordingly, processing the map information may include the functions of i) converting map information from various map data providers to a unified data structure, ii) preparing the necessary map data structure suitable for matching a derived trajectory of the user, and/or iii) storing the map information in local storage, such as memory 48 (for embodiments in which anchor point set assignment is performed remotely) or memory 44 (for embodiments in which anchor point set assignment is performed locally).

On-line indoor/outdoor map service providers may provide web Application Programming Interfaces (APIs) to access their map database. Accordingly, the corresponding APIs from the map provider may be used to obtain map information for an area encompassing the user's trajectory. Particularly notable examples of venues that may have corresponding map information include indoor environments such as retail stores that may also provide point of sale information for determining anchor points. This map information may be processed to facilitate its use, such as by decoding to extract the necessary map data used for techniques of this disclosure using the APIs and converted into a unified format such as the Geographic Javascript Objective Notation (GeoJson) format, although xml files, binary files and others may be used. The converted map data can then be saved in the local storage for the future use. The decoding and conversion may be performed by external resources and delivered in any suitable manner for use during anchor point ordering. Generally, it is desirable to minimize the number of times processing operations are performed for each venue.

In some embodiments, obtained map information may be transformed into a geometric map. As such, processing the map information may include segregating it into traversable and non-traversable regions. For example, corridors represent an important class of traversable regions in typical indoor environments. As such, a corridor clipping function may be performed to extract corridor shape information from background entities if the corridor information is not available to present the map information as a polygon based geometric map. Many conventional map service providers do not offer corridor shape information which is important in an indoor map aided algorithm. Therefore, a suitable technique for obtaining the shape of corridors that may be present in the venue may include extracting all the other entities from the background entity. The background entity may be a boundary contour that establishes a given building or level of a building or other venue. Foreground entities within a venue may include all objects such as stock shelves, rooms, checkout stands, elevators, escalators, stock shelves, rooms, checkout stands, wall boundaries and other obstacles within the area encompassed by the map. The clipping process as used herein refers to the process of cutting away from a set of 2-dimensional geometric shapes those parts that are outside a particular 'clipping' window. This can be achieved by intersecting a subject polygon (background entity) with a clipping polygon (other foreground entities on top of the background entities). The polygons may be defined by a sequence of vertices and any curves may be represented as an appropriate set of line segments.

Figure 13:
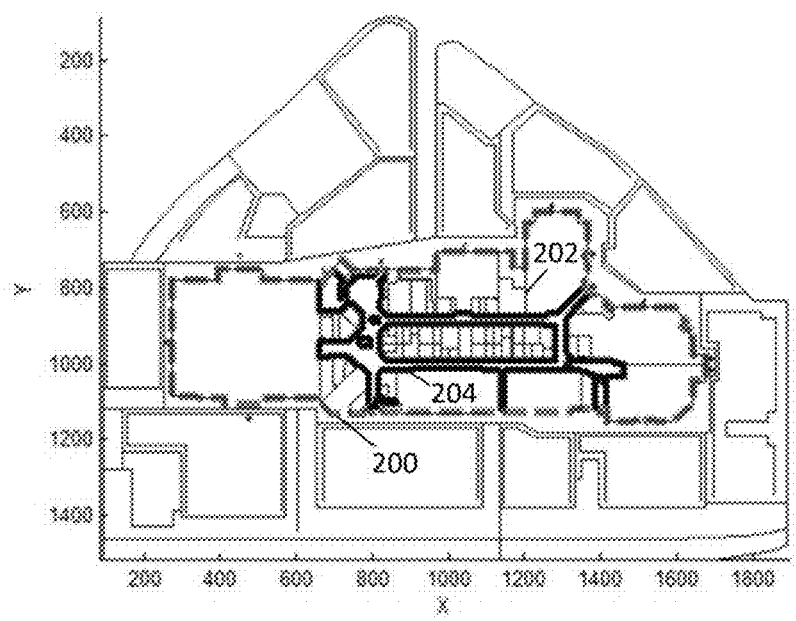
FIG. 13 is a schematic representation of map entity clipping in a geometric map according to an embodiment.

After iteratively clipping all the other entities from the background, the corridor polygon may be obtained. A suitable clipping algorithms may be configured to accommodate relatively complex polygons with holes, for example, the Vatti clipping algorithm. An illustration of the results of a clipping algorithm are shown in FIG. 13 for a representative polygon based geometric indoor map. The background entity 200 for a portion of the map is represented by a dashed line. Foreground entities are represented as polygons with fine lines, such as polygon 202 (the others are not labeled to preserve clarity), are clipped on top of background entity 200. The resulting polygon 204, represented by the heavy line, gives the shape of the corridor. The resulting corridor shape may be represented by a complex polygon. A complex polygon used herein is a polygon (without self-intersection) which has one or multiple holes inside.

As will be described below, some map entities may provide inherent position information, such as elevators, escalators, or stairs that may be associated with level change scenarios or conveyors that may allow the assumption of heading or other position information. The locations of the entrances and exits to the background map entity, as well as doors or other entrances/exits to foreground entities may also be used. Still further, the direction of the entrances/exits may also be used when generating hypotheses. In a multi-level venue, the height of each level may be used with sensor information indicating changes in elevation to help determine when a level change scenario may exist.

In addition, processing may include decomposing one or more shapes of the map entities into small simpler polygons to improve the computation efficiency when ordering the anchor points. A trapezoid decomposition may be used to decompose relatively complex polygons into more simple trapezoids, while a convex decomposition may be used to partition relatively complex polygons into more simple convex polygons. An optimal decomposition algorithms may be applied to generate a reduced number of polygons after the decomposition process. Any one or combination of decomposition methods may be employed.

Figure 14:
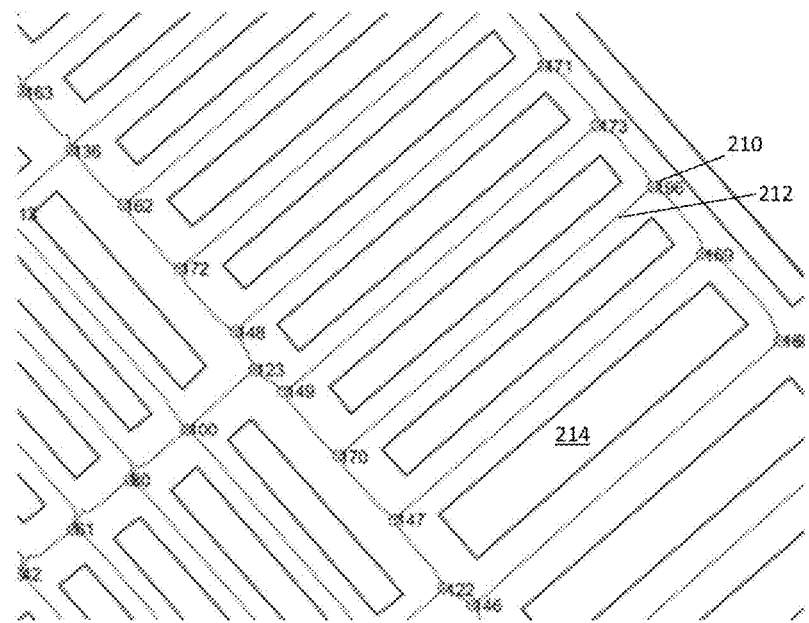
FIG. 14 is a schematic representation of grid map according to an embodiment.

Processing the map information may also include transforming the traversable areas of the indoor maps with connected traces and nodes in a grid map. Connected traces and nodes may contain both the geometric and the topological information of the map. Any suitable technique may be used to generate the grid map, such as for example by using a voronoi diagram, to represent candidate paths through the venue. An example voronoi diagram is shown in FIG. 14, and includes the characteristic elements of nodes, represented by circles, such as node #196 indicated as element 210 and traces, represented by the connecting lines, such as element 212. A node is any point on the map equidistant to three or more closest objects, the map entities indicated by solid polygons, such as element 214. In this example, the map entities shown are rectangular shelves. To illustrate these concepts, it may be seen that node #196 has three equidistant closest objects, namely the two surrounding shelves and the wall. Similarly, node #100 has four equidistant objects, the four surrounding shelves. Correspondingly, a trace is a set of points (i.e., a line) which is equidistant to only two closest objects. The straight line connecting node #196 and node #170 is an example of a trace, as each point of the line has only two closest objects. Thus, the grid map shown in FIG. 14 is characteristic of a retail venue with regularly spaced rectangular shelves, with the nodes and tracks representing candidate paths that a user could take around the map entities.

Figure 15:
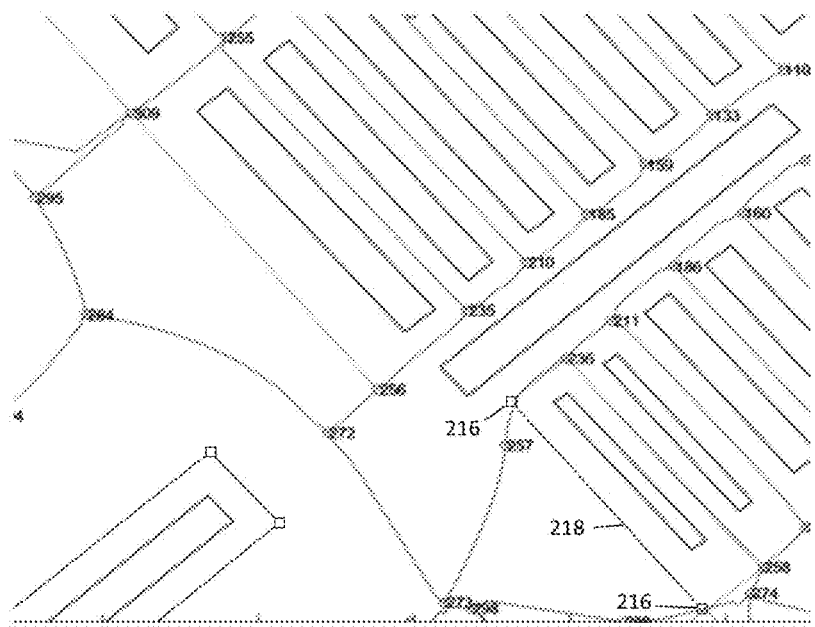
FIG. 15 is a schematic representation of grid map having supplemental nodes and traces according to an embodiment.

Depending on the configuration of the retail venue, the nodes and traces developed from the voronoi diagram may not account for all possible routes, such as routes around objects which are located at the perimeter of open spaces in the retail venue. Additional operations as shown in FIG. 15 may be performed to complete the possible routes by adding supplemental nodes, indicated by squares such as 216 and traces, indicated by dashed tracks such as 218. The supplemental nodes and traces complete candidate paths around map entities.

Figure 16:
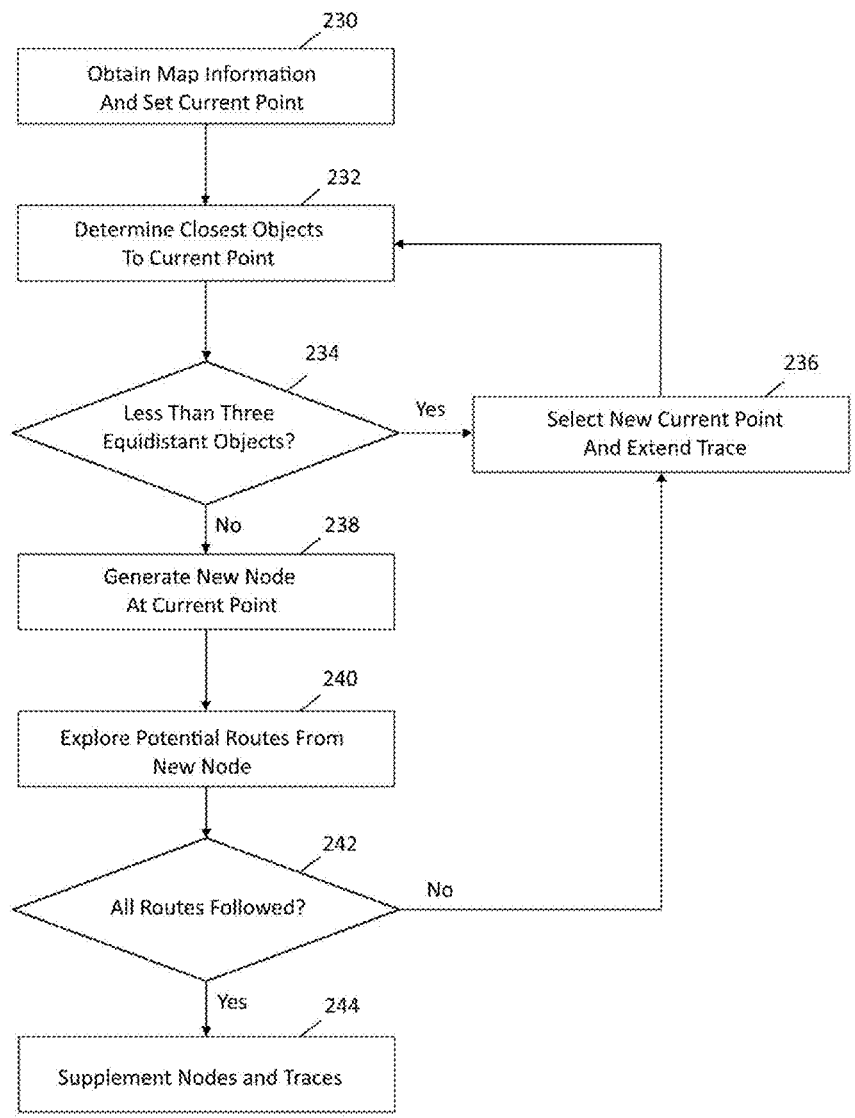
FIG. 16 is a schematic representation of routine for generating a grid map according to an embodiment.

One suitable routine for generating a grid map for use in ordering anchor points is represented by the flowchart shown in FIG. 16. Beginning with 230, map information for a venue, such as a retail store, may be obtained, with map entities represented by polygons as discussed above. An initial starting position may be selected to as the current point for generation of the voronoi diagram. In 232, the closest objects to the current point are determined. The routine branches in 234, depending on the number of closest objects. If less than three closest objects are equidistant, a new current point is selected and a trace is created or continued to the new current point in 236. The routine then returns to 232 to determine the closest objects with respect to the new current point. If three or more closest objects are equidistant in 234, the current point is designated a node in 238. Next, possible routes starting from the new node are explored in 240. A determination is made in 242 if a new route may be started. If so, the routine returns to 236 and a trace is formed to a new current point along the new route. If it is determined in 242 that all possible routes have been explored, the routine continues to 244 to determine whether any supplemental nodes and/or traces are required to complete routes around any of the map entities as described above. The complete set of nodes and traces than may be used to define candidate paths that the user could have traversed through the venue.

In one aspect, a grid map may enhance the geometric aspects of map information as well as providing topological aspects. The topological information from the indoor map may be also applied to improve the reliability and the accuracy of the anchor point ordering. For example, a retail venue map may be readily divided into structured areas and non-structured areas. Non-structured areas, such as open space, isolated booths and the like, may benefit from geometric based techniques as described above. However, structured areas, such as aligned shelves, booths and similar features may be abstracted as connected traces and nodes to be used in a grid based map.

Figure 17:
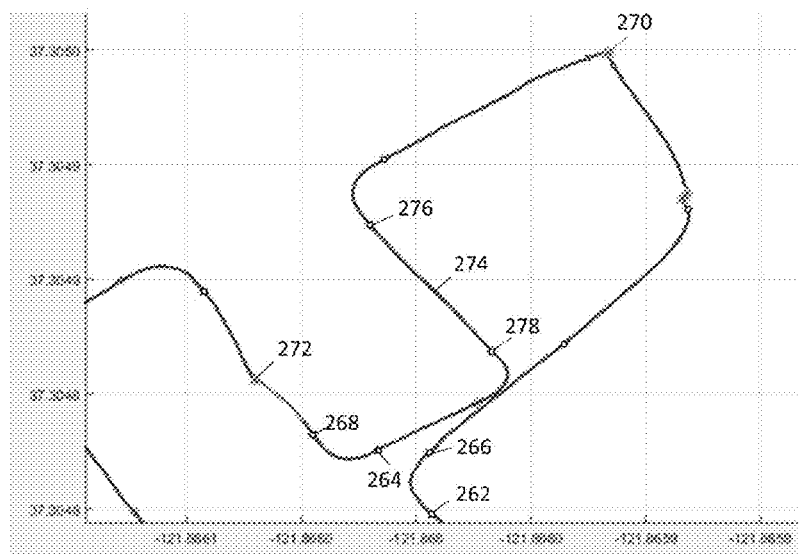
FIG. 17 is a schematic representation of portion of a user trajectory for turn identification with map information according to an embodiment.

As described above, a trajectory derived from motion sensor data may be refined by considering candidate paths from the possible routes indicated by the map information, such as interconnected nodes and traces of a grid map. In one aspect, the candidate paths may be evaluated in light of the correspondence between identified turns and other trajectory segments and the map information. The turn identification operations described above or others may be employed to characterize turns based at least in part on the underlying device heading of portable device 16, or the platform heading of the user, such as by examining the accumulative change rate of the heading information. In one embodiment, when a threshold rate of change is exceeded, a turn start may be identified. Correspondingly, when the rate of change falls back below the threshold, a turn end may be identified, such that the turn is defined as the portion of the trajectory between the turn start and the turn end. In the context of the example shown in FIG. 17, a portion of a trajectory derived from motion sensor data is represented by black track 260. Turn starts may be identified by squares, such as turn starts 262 and 264. Turn ends may be identified by circles, such as turn ends 266 and 268. If desired, heading information from the motion sensor data may be filtered to provide better determination of the starting and ending of turns. For example, high frequency heading noise may be present and may be reduced by employing a low pass filter.

Turns may also be identified in the context of periods of non-meaningful motion, such as fidgeting. A user may stop during the trajectory and may or may not interact with the portable device. During such periods, motion detected by the portable device may be characterized as a non-meaningful fidgeting period. Step length information may also be used when characterizing non-meaningful fidgeting periods. However, when the fidgeting period stops, the trajectory may have a new heading that constitutes a turn. When the heading change following a fidgeting period exceeds a threshold, a turn may be identified as shown by pair of triangles for fidgeting period 270. In contrast, the heading change following fidgeting period 272 did not exceed the threshold, so no turn has been identified. The trajectory may be further characterized by identifying links between consecutive turns. For example, link 274 may be identified as the portion of the trajectory extending between turn end 276 and turn start 278.

Figure 18:
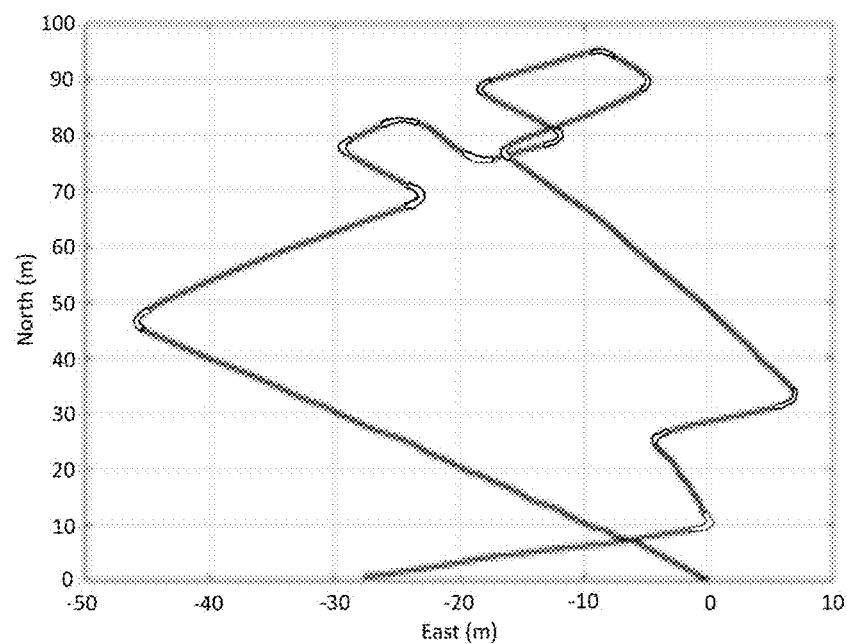
FIG. 18 is a schematic representation of a user trajectory following turn identification between adjacent segments according to an embodiment.

Another example of a suitable technique for identifying turns may involve characterizing an intersection between adjacent trajectory segments. Each trajectory segment may represent periods of straight line motion. The position of the portable device at multiple epochs along the trajectory may be determined, such as by using forward and/or backward processing as described herein. Positions that fall within a suitable threshold of a line may be grouped into segments corresponding to straight line motion of the portable device. When adjacent segments form an angle exceeding a threshold, a turn may identified having a center at the intersection between the adjacent segments. As an illustration only and without limitation, examples of suitable thresholds be in the range of 25° to 45°. An initial series of processing steps optionally may be performed on the trajectory. First, fidgeting periods and/or periods characterized as having zero step length may be identified and removed from the trajectory. The remaining portions of the trajectory may then be connected and one or more smoothing passes may be performed to generate a smoothed trajectory. Following these initial operations, the trajectory may be divided into a plurality of adjacent straight line segments. The angles formed by adjacent segment pairs may be compared to a threshold. When the angle exceeds the threshold, a turn may be identified, with the center of the turn located at the intersection between the segments. After grouping all segments that do not exceed the threshold together, an output trajectory may be generated as shown in FIG. 18, with each turn designated by an outlined portion of the trajectory.

Any one or combination of the turn identification techniques described above, or others, may be employed as desired. In some embodiments, different techniques may be performed in parallel and used to verify or reject one or more of the identified turns.

Figure 19:
FIG. 19 is a schematic representation of a user trajectory on a grid map according to an embodiment.

Following decomposition of the trajectory derived from motion sensor data, any of the identified turns and links may be used to shape match the trajectory with the possible routes established by the map information to generate candidate paths. Another exemplary grid map for a retail venue is shown in FIG. 19, with nodes represented by dots, traces represented by the connecting dotted lines and objects represented by polygons. The trajectory derived from motion sensor data is represented by outline track 290. Two consecutive turns, with respective starts and ends, are indicated on track 290 by the closed circles and a first link exists between the start of the trajectory and the first turn and a second link exists between the two turns. The initial link may be used as a basis for shape matching to the grid map. Link parameters include the length of the link, which represents the distance that the user over the portion of the trajectory corresponding to the link, and the heading of the link. The heading may be determined by the relationship of the start of the link to the end of the link. As shown in FIG. 19, the initial link starts at node #512 and has minimal heading drift. To match the initial link to the grid map, the distance starting from node #512 along the heading of the link may be seen to extend to either node #558 or node #582. The distance on the grid map from node #512 to #558 or #582 may then be compared with the length of the link through a ratio test. Depending on the results, either or both nodes #558 and #582 may be identified as nodes on candidate paths. All the possible candidates for the initial link may be maintained.

Next, the turn following the initial link may be matched to the map to continue the process. Each turn may have a turning angle parameter that may be determined by the heading differences between the precedent link segment and the subsequent link segment. The magnitude and direction of the turning angle may be used to determine whether the current turn is a right or a left turn. For the candidate path incorporating node #558 as end of the initial link, a right hand turn may be seen to lead to node #493. If there is a grid edge between node #558 and #476, then node #476 may also be determined as a possible candidate node that forms a right turn with node #558, depending on the angle discrimination test threshold when comparing the turning angle magnitude of the trajectory turn with the approximately 90 degrees right turn of the grid map.

Figure 20:
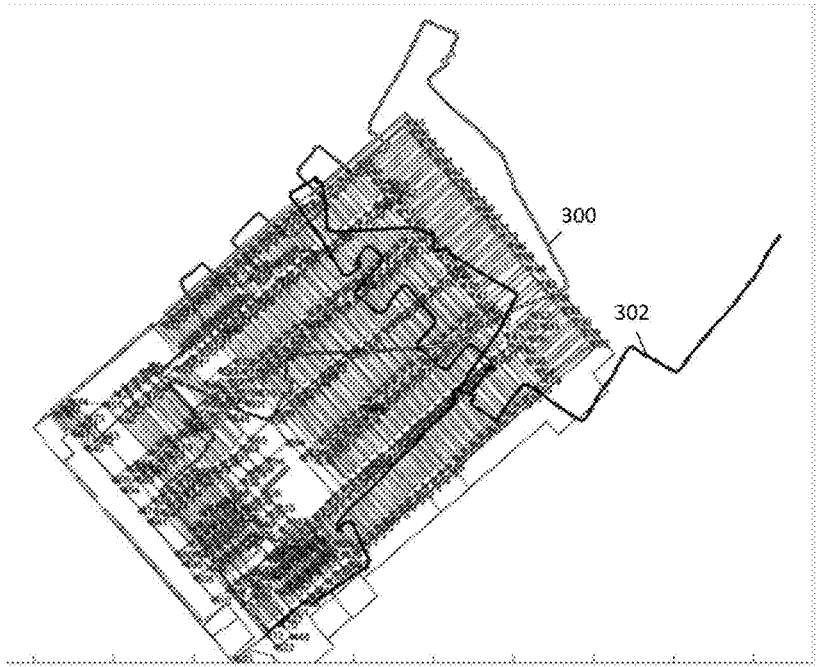
FIG. 20 is a schematic representation showing trajectories derived by forward and backward processing according to an embodiment.

The operations of navigation module 38 in deriving a user trajectory based on motion sensor data has primarily been described in the context of forward processing the sensor data. However, in some embodiments, performance may be improved by also implementing backward processing of the sensor data. For example, FIG. 20 shows an example of a trajectory derived by forward processing as outline track 300 and a trajectory derived by backward processing as black track 302. Ordering of the anchor points may benefit from the additional backward solution. Notably, the same turn identification procedure may be applied to the backward processing so that the identified turns may verify the turns identified from forward processing or complement the forward solution if a turn was not detected. Further, the same ordering process may be applied to the backward solution, so that the backward ordering results may be combined with the forward ordering results to help resolve any uncertainties in the anchor point ordering.

Additionally, one or more smoothing passes may be performed in conjunction with forward and/or backward processing the motion sensor data. Input data may also be included from other sources when available, such as absolute navigation information, models of user dynamics (e.g., step length estimation), characteristics of sensor performance (e.g.), supplemental sensor data and others. The navigation solution used to derive the user trajectory may include any suitable information related to the position, motion and/or orientation of portable device 18. For example, a navigation solution may include position, velocity and attitude, position and attitude, position and velocity, position and speed, attitude alone or other combinations of these quantities. The navigation solution may also include other related quantities, such as the quantities used for the errors in input data. The term navigation used in this application is not limited to online or real-time navigation solutions, it may also include offline or post-processing solutions among others.

Generally, forward and backward processing of the input data may be performed to derive interim navigation solutions. One or more quantities of the interim navigation solutions may be combined to smooth the quantities. Further passes of forward and backward processing may performed as desired using quantities of the navigation solution that were combined to further enhance the navigation solutions. Backward processing may also be helpful for a long trajectory when positioning information toward the end of the trajectory is available, such as from an anchor point like a checkout point or store exit. A backward processed navigation solution may significantly reduce the accumulated error that may otherwise occur. Furthermore, more reliable misalignment estimates may be obtained. Further details regarding forward and backward processing and smoothing operations that may be performed are described in co-pending, commonly-assigned U.S. patent application Ser. No. 15/054,792, filed Feb. 26, 2016, which is entitled "Method and Systems for Multiple Pass Smoothing," and is incorporated by reference in its entirety.

The forward and backward sensor solutions may also be combined and smoothed first, such as for example using a two filter smoother or a multiple pass smoother. Moreover, a Rauch-Tung-Striebel (RTS) smoother or any other suitable smoothing filter or any backward smoothing technique may be employed. In some embodiments, smoothed sensor navigation solution may be used as the input to perform map matching. Alternatively, a simplified smoothing technique using the weighted average of step length estimates from the forward and backward sensor navigation solutions may be used. Since map matching mainly uses the relative positioning information, weighted step length estimates not only reduce the computation load, they also provide significant benefits during smoothing processes. Alternatively, a simplified combining technique for forward and backward using the weighted average of the relative position changes from the forward and backward sensor navigation solutions may be used.

In one aspect, an initial enhanced navigation solution may represent a position gap with respect to navigation solutions from adjacent epochs. Any gaps may be smoothed using suitable techniques, such as by recalculating a determined trajectory. For example, the recalculation may employ an estimated user step-length scale factor. The step length scale factor may updated from segment to segment so that after smoothing, no unreasonable position jumps exist in the map matched enhanced navigation solution(s). While smoothing may not necessarily improve the overall accuracy or success rate, it nevertheless may provide a more useful presentation of the position information.

In some embodiments, one or more trajectories may be generated by map matching using hypotheses. A hypothesis refers to a possible location of user with any desired corresponding attributes, such as position, velocity, heading, motion mode, position variance, occupied map entity and the like. The decision making logic applied to the various hypotheses may be selected based on the user operational scenarios as indicated in the following examples.

Many implementations of a decision making logic for hypothesis management employ the concept of an error region. As will be appreciated, the error region represents an uncertainty of the possible position(s) of portable device 18. As desired, an error region may define a rectangle, a circle, an ellipse, an arbitrary polygon or any other shape. If a Kalman filter is used to estimate the position of portable device 18, an "error ellipse" may be used. The parameters of an error ellipse include the semi-major axis length (a) and semi-minor axis length (b), and orientation ($\alpha$) may be derived from the covariance matrix of the Kalman filter and the predefined confidence level. For example, a 95% confidence level may be used to reasonably cover the position uncertainty, although other values may be employed depending on the desired performance characteristics. Correspondingly, the error ellipse parameters may be given by Equation 8:

$$a = \sqrt{5.991\lambda_1}$$
$$b = \sqrt{5.991\lambda_2}$$
$$\alpha = \tan^{-1}\frac{v_1(y)}{v_1(x)}$$
(8)

where $\lambda_1$ and $\lambda_2$ represent the eigenvalues of the covariance matrix and $v_1$ represents the eigenvector of the covariance matrix with the largest eigenvalue. In order to reduce the computation load, the error ellipse may be approximated by a polygon with several vertices, such as 32 vertices, evenly distributed around the edge of the ellipse.

Figure 21:
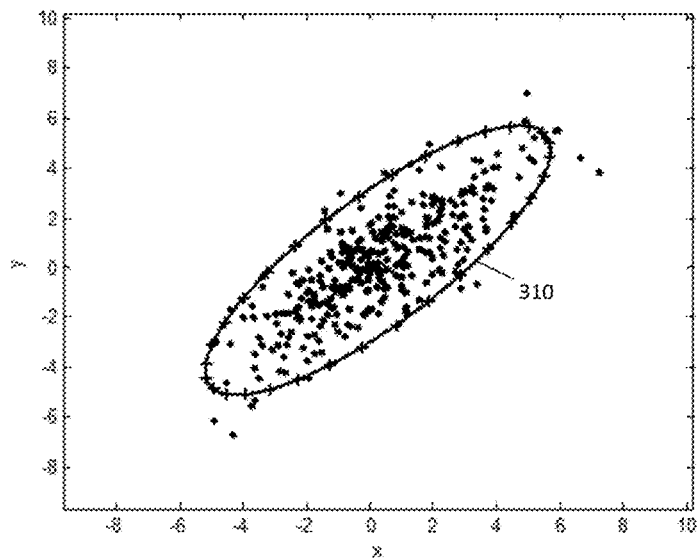
FIG. 21 is a schematic representation of an error ellipse for use in generating hypotheses according to an embodiment.

If a particle filter is used, samples of position estimates may be used to approximate the error region. However, the error ellipse or other region may still be employed to combine and eliminate hypotheses. Therefore, the covariance matrix may be derived from the position sample data. Then the parameters of the error ellipse may be calculated as in the Kalman filter mode. To illustrate, FIG. 21 shows an example of an error ellipse derived from a particle filter using 95% confidence level. The "+" symbols indicate the vertices of the approximated error ellipse 310.

Figure 22:
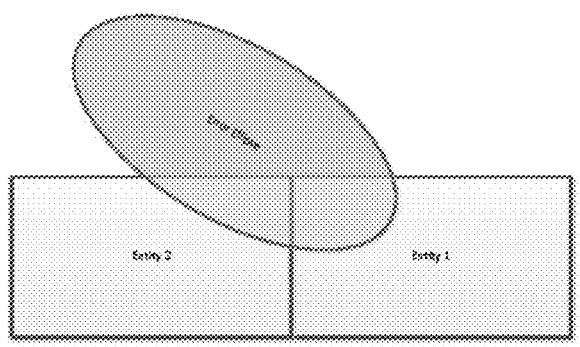
FIG. 22 is a schematic representation of an error ellipse projected onto map entities according to an embodiment.

In reference to the context of an error region, various decision making logic approaches may be applied for managing the hypotheses. A first example corresponds to a scenario with a wall crossing event. Each hypothesis may have its own occupation field to indicate the current map entity associated with portable device 18. As shown in FIG. 22, a position estimate may use the error region superimposed on the map layout to obtain the candidate hypotheses. If no overlapping area between the error region and map entities other than the currently occupied entity is detected, no further operations may be necessary. However, when the error region intersects with multiple map entities, the attributes of the intersected entities are inserted into an intersection table. The overlapping detection can be fulfilled by iteratively checking the location of vertices from the approximate polygon for the error ellipse. The spatial search algorithm, for example, an R-tree search and point-in-polygon algorithms, may be applied to find the map entity for each vertex of the error ellipse. If all the vertices are on the same map entity as the current hypothesis's occupation, no overlapping is declared. Otherwise, a new hypothesis candidate will be added to the intersection list. It is noted that each hypothesis maintains its own intersection list. The current hypothesis may be called the parent hypothesis whereas all the candidate hypotheses may be called children hypotheses.

If the intersection area is over a suitable threshold, such as approximately 10% of the total area of the error ellipse, the new hypothesis candidate may be subjected to further analysis, otherwise it will be removed from the intersection list. All the candidates in the intersection list different than the occupation of the current hypothesis may then be analyzed. The initial position of the new candidate hypothesis is given by a current position estimate. However, if this point is not in the range of the overlapping polygon, the centroidal moments of the overlapping polygon may be used as the initial position of new hypothesis instead.

Figure 23:
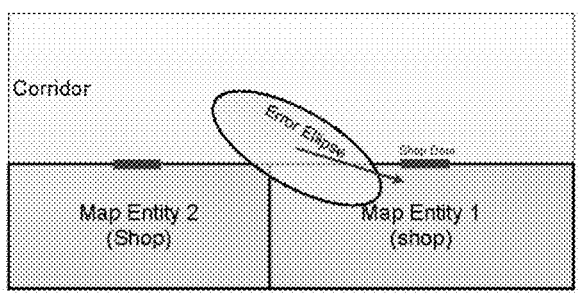
FIG. 23 is a schematic representation of an error ellipse in a corridor scenario with door information according to an embodiment.

Subsequently, a wall crossing detection may be performed. The logics of the wall crossing event are based on whether the room door information is available. If door information is available, the algorithm may evaluate the distance between the candidate hypothesis's initial position and the door's position as schematically indicated in FIG. 23. If the distance is within a predefined threshold, such as 2 meters, a wall crossing event may be declared. The center position of the room door may then be used as the initial position of the new candidate hypothesis. Next, a validation check may be performed to determine whether the initial point of the new hypothesis is within the range of other current available hypotheses. Subsequent operations may be adjusted depending on the particular implementation. When using a particle filter, for example, a new hypothesis may be created with all the particles residing in the new map entity and added to the hypothesis list. All other attributes, except the position of the newly created hypothesis, may be inherited from the parent hypothesis. When using a Kalman filter, for example, no new hypothesis creation and/or eliminate are performed and the position and occupation fields of the parent hypothesis may be updated.

Figure 24:
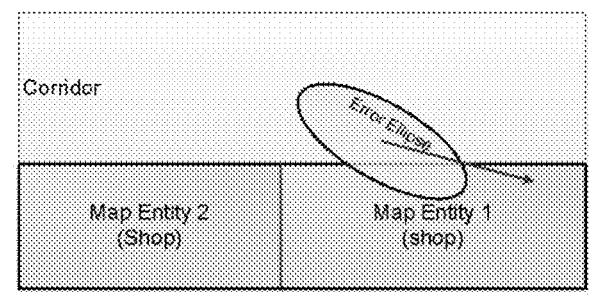
FIG. 24 is a schematic representation of an error ellipse in a corridor scenario without door information according to an embodiment.

If the room door information is not available, the angle between the intersection edge of the error ellipse and the map entity of the interest, and the user's heading may indicate the possibility the user may enter into the new entity as schematically indicated in FIG. 24. If the heading of the current hypothesis is nearly parallel to the edge of the room, this intersection may result from a skewed navigation solution. In this case, if the overlapping area is above a suitable value, such as approximately 45%, a new hypothesis with an offset of a predefined amount, such as approximately 0.5 meter, from the intersection point is created and the parent hypothesis is deleted. On the other hand, if the overlapping area is below the predefined amount (and optionally if the yaw dynamics of the user are small), the orientation of the intersection edge may be used to update the heading of the parent hypothesis. If the heading of the current hypothesis is approximately perpendicular to the edge of the wall, a possible wall-crossing event is declared. Correspondingly, a similar process as when room door information is available may be performed.

Occupation transitions of the hypotheses may also be analyzed. It is assumed that a user can freely enter and exit a corridor. However, between-unit crossing is prohibited or assigned with minimum weight to reflect the fact that it is uncommon to have doors between shops. In addition, weights of hypotheses based on this transition model or empirical model may be assigned as desired.

Another exemplary decision logic for managing hypotheses may be applied when a level change event may be associated with one or more sensor epochs. If a user was/is going up or down stairs, taking an elevator or escalator, a routine may be performed to detect a corresponding motion mode and/or context indicator to identify the current user motion mode/context (such as elevator, stairs, walking, walking on escalator, or standing on escalator). When a level change event was/is detected, a navigation solution corresponding to the sensor epoch may be used to search for map entities in the map information, such as stairs, elevator or escalator entrances, that are sufficiently nearby according to the detected mode. For example, if an elevator mode was/is detected from the navigation solution, a search may be performed for a nearby elevator entrance on the map. If the entrance is within certain distance from the current user position, the assessment of hypotheses may transition from a normal state to a level change state to apply a corresponding decision logic. The distance threshold may be 10 m as a non-limiting example. Further, the selected value can be tuned according to the accuracy of the navigation solution.

As noted, detection of a level change event may result in transition from a normal state to a level change state when analyzing hypotheses. If desired, a validation process may be performed to avoid a level change false alarm. During the process, the user position may be propagated initially using techniques similar to the normal state. The validation process may use a height difference between a given epoch and the epoch when entering the level change state as the metric to verify change in state. If within a certain time, detection of a height difference above a threshold, such as 2.0 m as a non-limiting example, the transition to level change state may be validated. Otherwise, the detection may be treated as a false alarm, resulting in a return to the normal state.

Given successful validation of the level change, all current hypotheses may be eliminated and new a hypothesis created using the identified level change entrance information. The initial position of the hypothesis and/or heading may be established by the entrance position of the corresponding map entity. Map information corresponding to the new level may then be used, such that the new level is identified by as above or below the previous level according to the sign of the height difference. Subsequently, analysis of hypotheses may transition to a finalizing state. If the validation process failed, the state goes back to the normal state.

Figure 25:
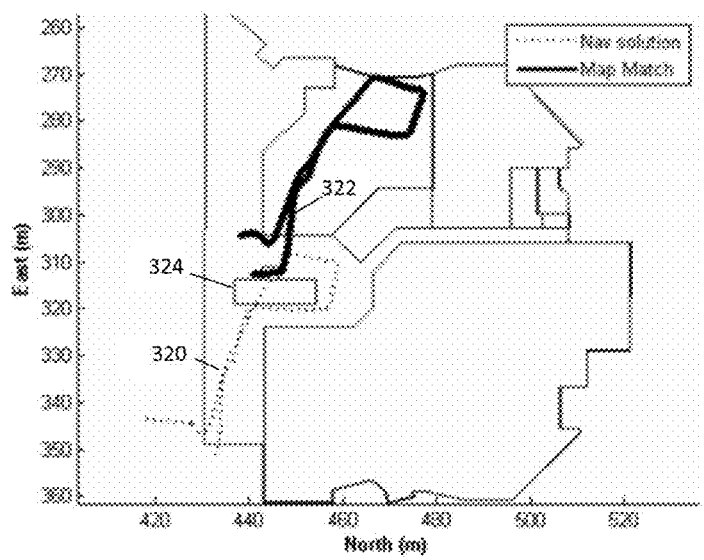
FIG. 25 is a schematic representation comparing navigation solutions in a level change scenario according to an embodiment.

In the finalizing state, a suitable hypothesis analysis may consider whether a motion mode was detected for the associated navigation solution. If a walking status was/is detected, the position of the corresponding hypothesis may be reset to the exit position of the level change entity and revert to normal state as schematically depicted in FIG. 25. Hypothesis 320 may correspond to the position estimate provided by the navigation solution, while hypothesis 322 may reflect the updated position estimate based on the assumption of exiting elevator 324. Otherwise, the user position may continue to be propagated. It is noted that the algorithm does not reset the heading of the hypothesis according to the level change entity layout after exiting it. This is because the user heading may already have changed due to a delay in detecting the current motion mode. As shown in FIG. 25, the door of the elevator is on the right side (0°), however, the user heading is around −90° after exiting the elevator.

In addition to the motion modes and/or context awareness scenarios discussed earlier (such as when a user goes up or down stairs, takes elevators or escalators), some other motion modes and/or contexts such as walking or standing on a conveyor (moving walkway), walking near an wireless beacon or other wireless radio frequency (RF) tags and the like may be used when assessing hypotheses. When the system autonomously detects such motion modes or context awareness scenarios, the map information techniques presented herein can relate those to map entities. Benefits of this implementation include: (i) detection of a motion mode/context that relates to a map entity and may enhance the navigation solution (particularly position and optionally heading) to the location of the map entity; (ii) a map entity may imply a motion mode and/or context, which may be used to aid recognition of sensor data patterns associated with the implied motion mode.

For example, when it is determined a user was/is walking/standing on a conveyor, a search may be performed for a nearby conveyor in the map information. When a nearby conveyor is found, a new hypothesis may be created with the entrance of the conveyor as the initial position and the orientation of the conveyor as the initial heading, eliminating all the other hypotheses. A similar process to that applied regarding a level change event when a user steps out of the conveyor. This context based 2D position adjustment may reduce the accumulated error from PDR and thus improves the enhanced navigation solution of the offline map matching. On the other hand, when a hypothesis's error region is on top of a particular map entity such as a conveyor, an elevator or an escalator, detection of the corresponding motion mode may be based on this information to increase the sensitivity of the particular detection and improve the success rate.

A similar process may be applied to a walking/driving motion mode detection scenario when a user is identified on a parking lot. For example, if the hypothesized position is on top of a parking lot, this information can be fed to the navigation system to improve the sensitivity of the driving/walking detection module.

Another exemplary scenario involves updates from a wireless beacon or RF tags. If the entrance of a shop or information desk is equipped with wireless beacon or RF tags, the portable device may receive the information from these wireless tags when it is sufficiently close. In this case, the position of the shop entrance or information desk can be used to update the position of the hypotheses.

Figure 26:
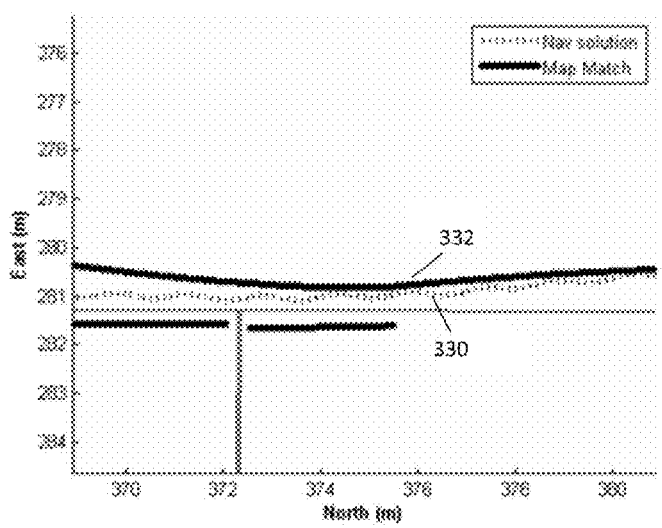
FIG. 26 is a schematic representation comparing navigation solutions following heading oscillation removal according to an embodiment.
Figure 27:
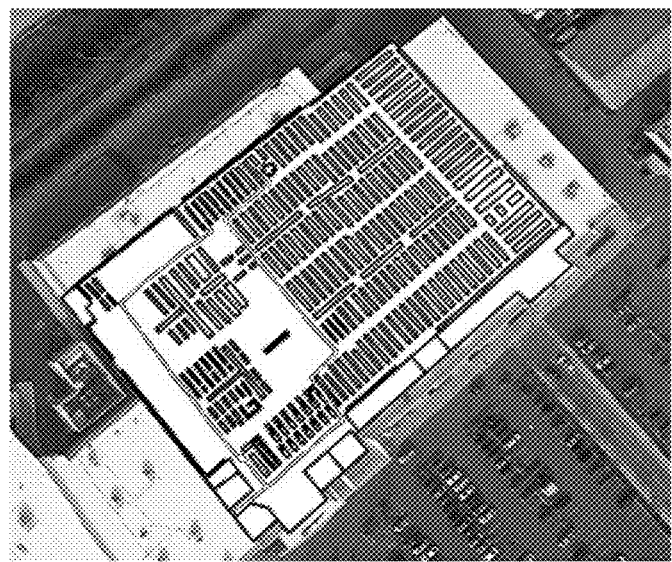
FIGS. 27-30 are schematic representations of four test trajectories according to an embodiment.
Figure 28:
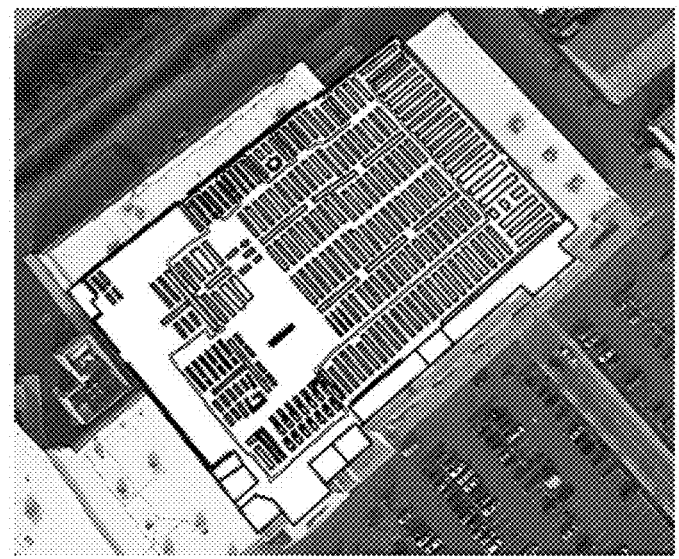
Figure 29:
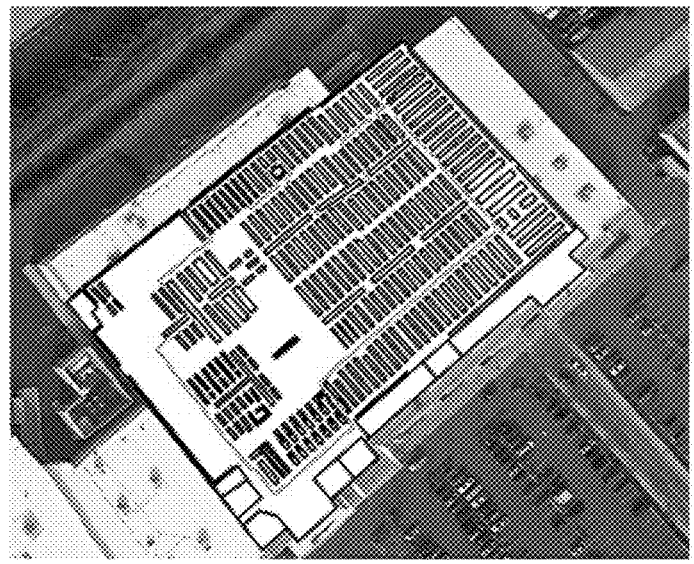
Figure 30:
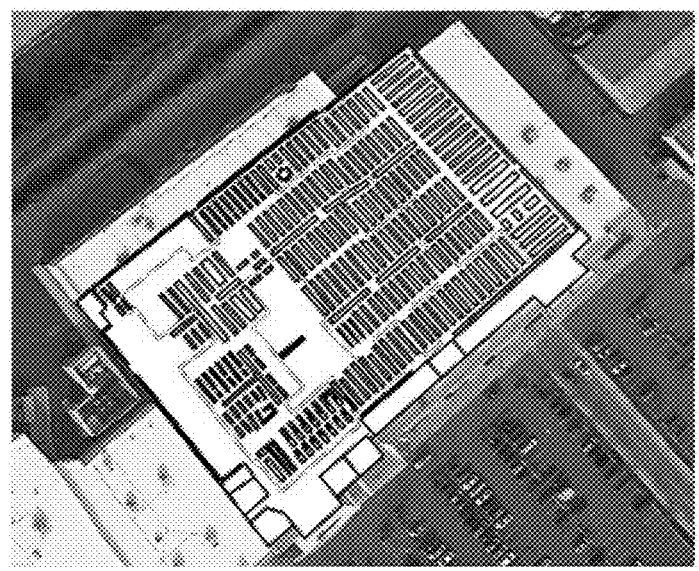
Figure 31:
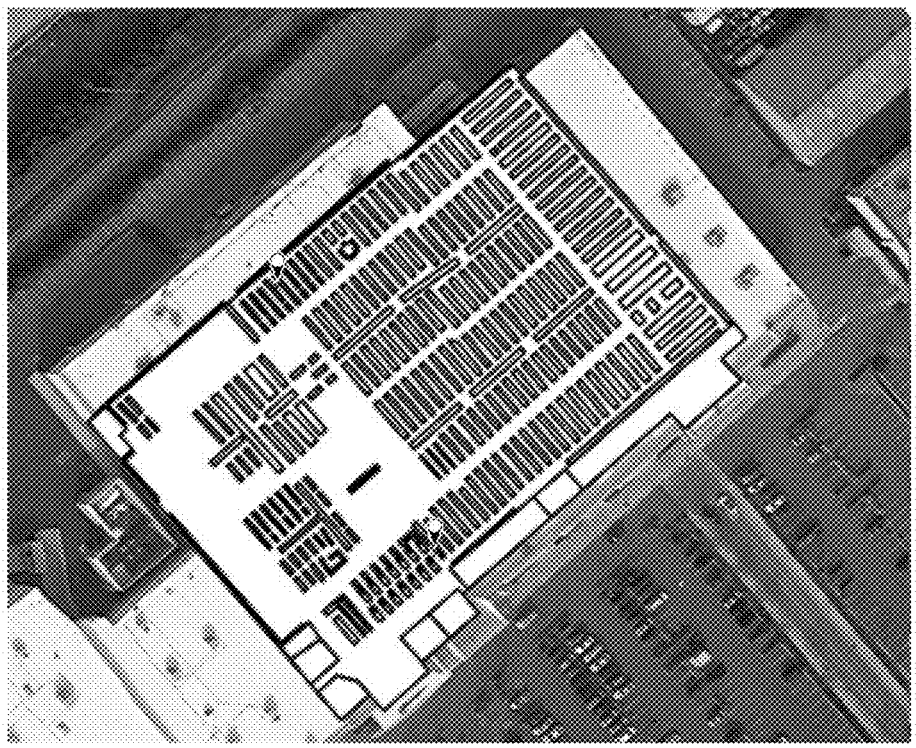
FIGS. 31-38 are schematic representations of eight anchor point sets according to an embodiment.
Figure 32:
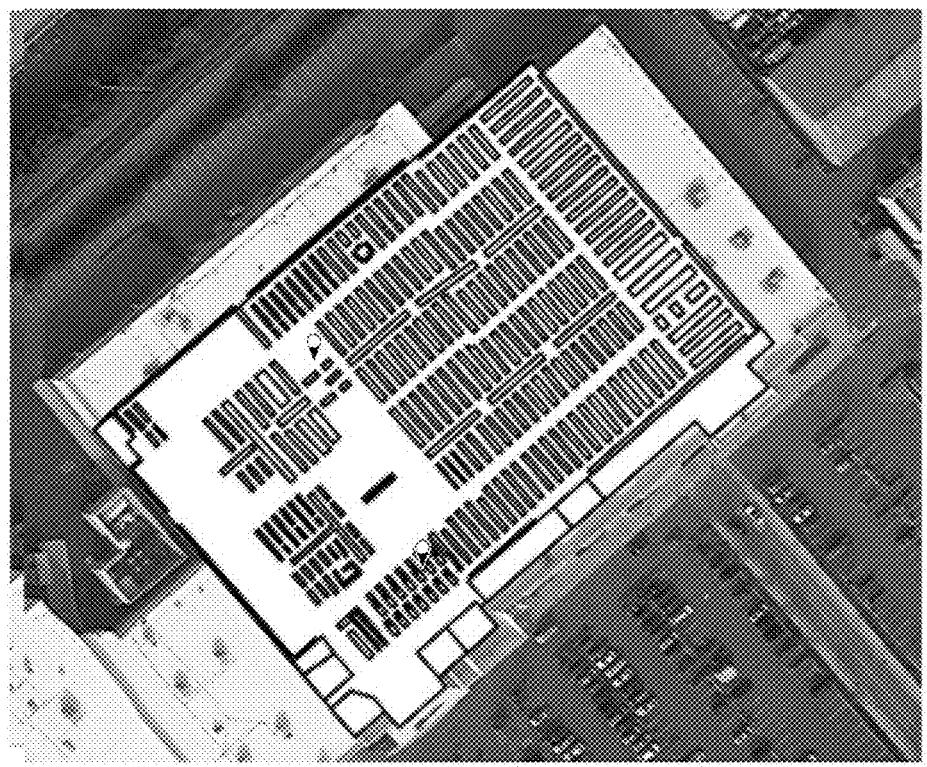
Figure 33:
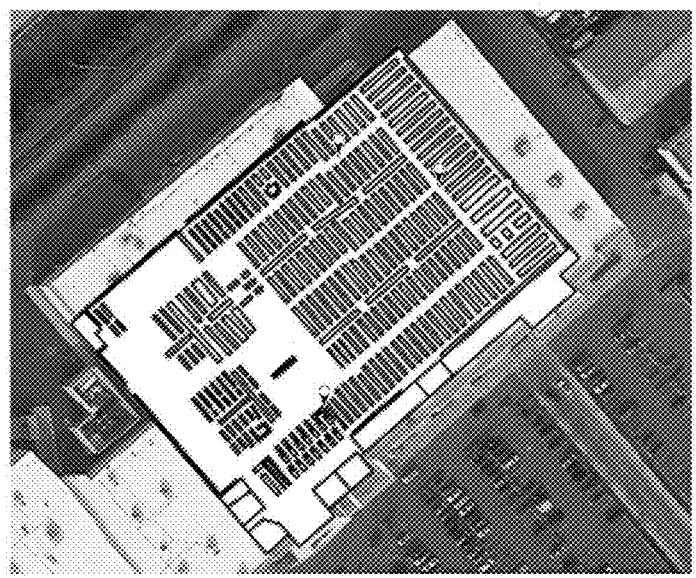
Figure 34:
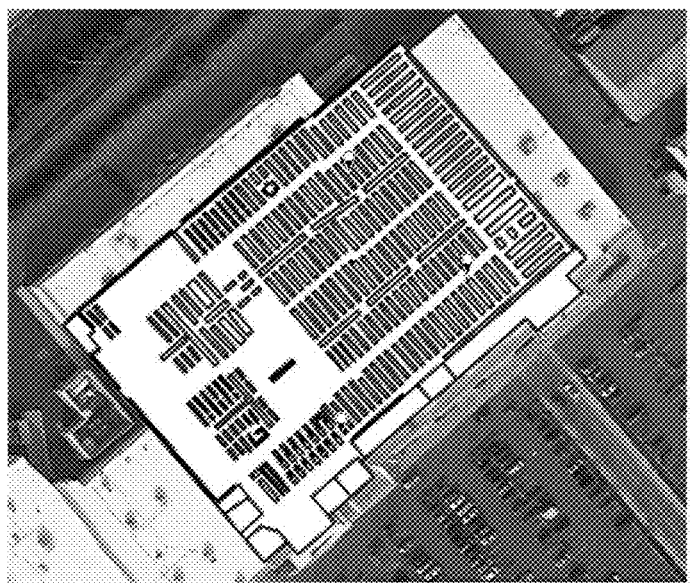
Figure 35:
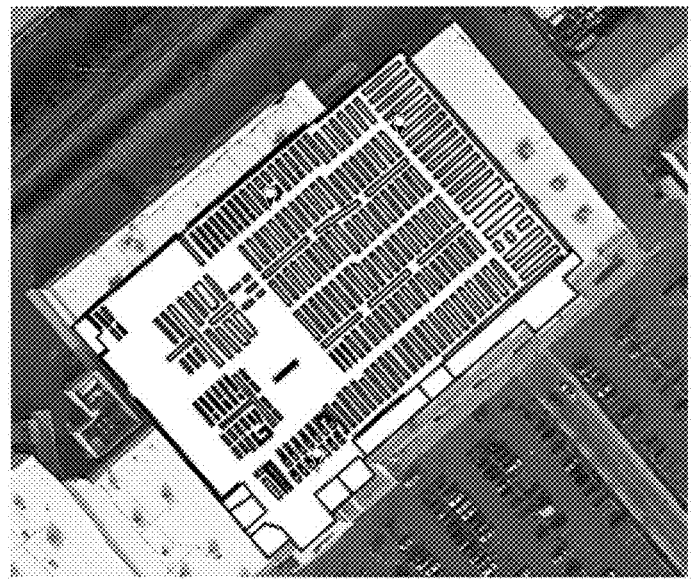
Figure 36:
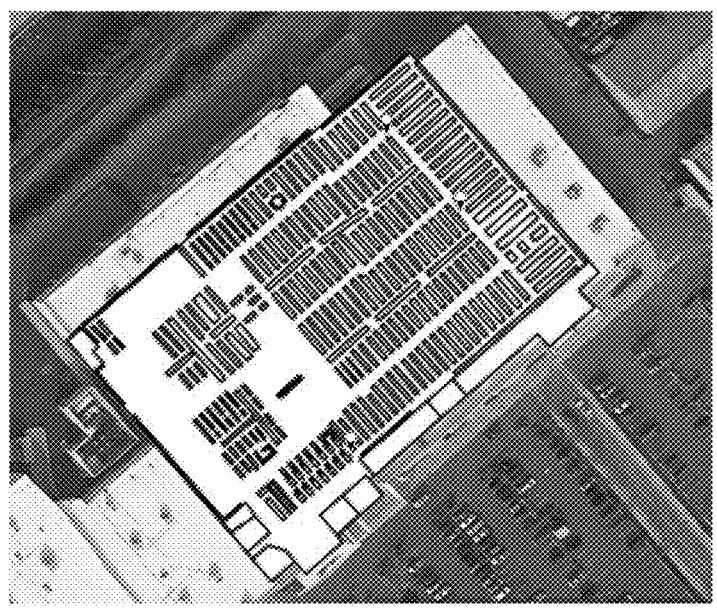
Figure 37:
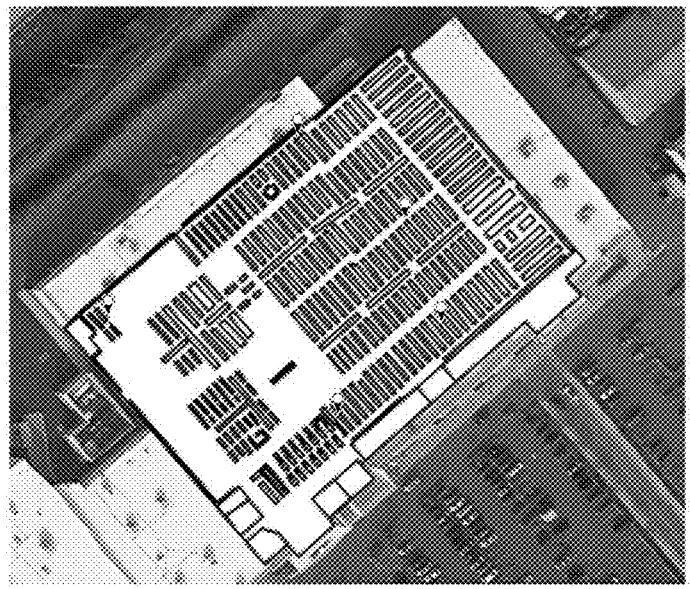
Figure 38:
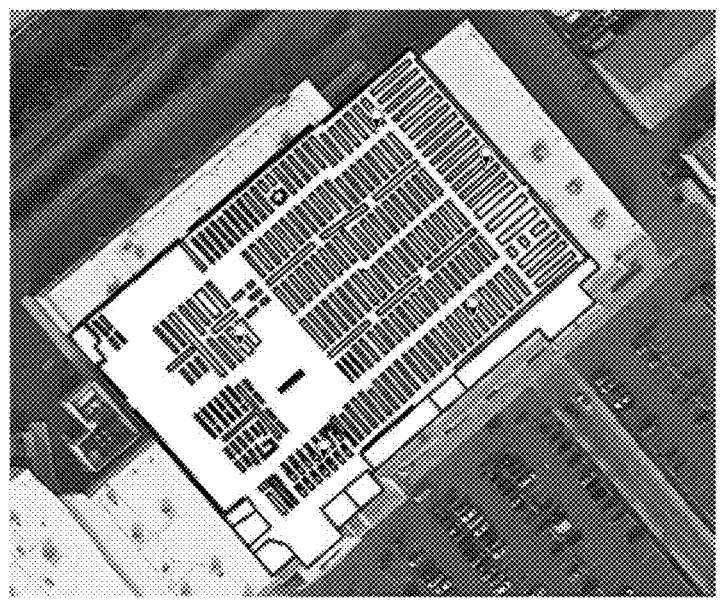
Figure 39:
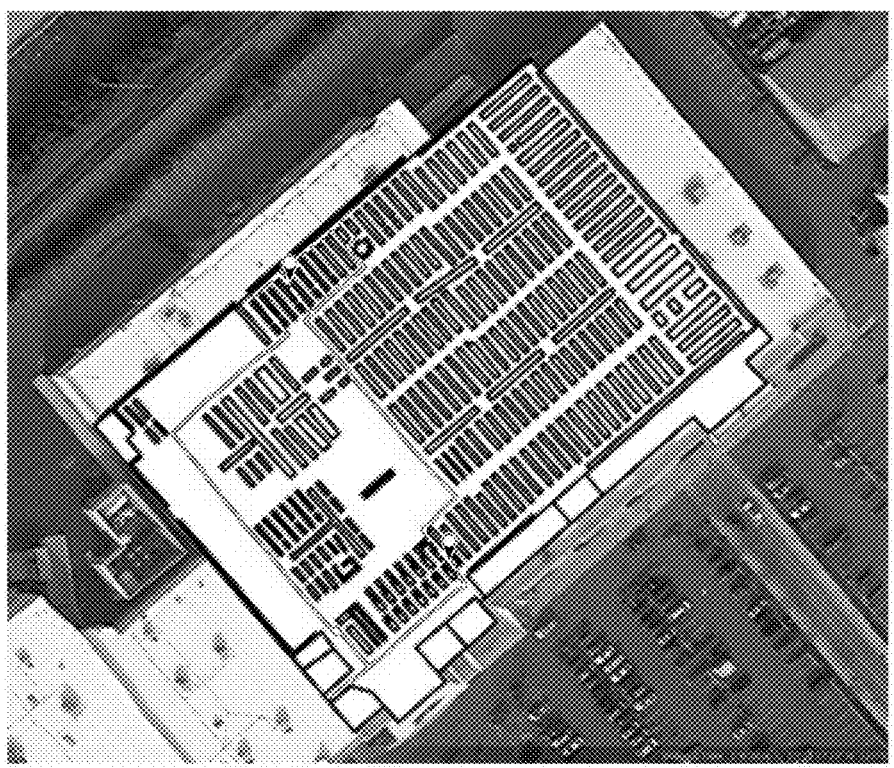
FIGS. 39-42 are schematic representations of the four test trajectories with their assigned anchor point sets according to an embodiment.
Figure 40:
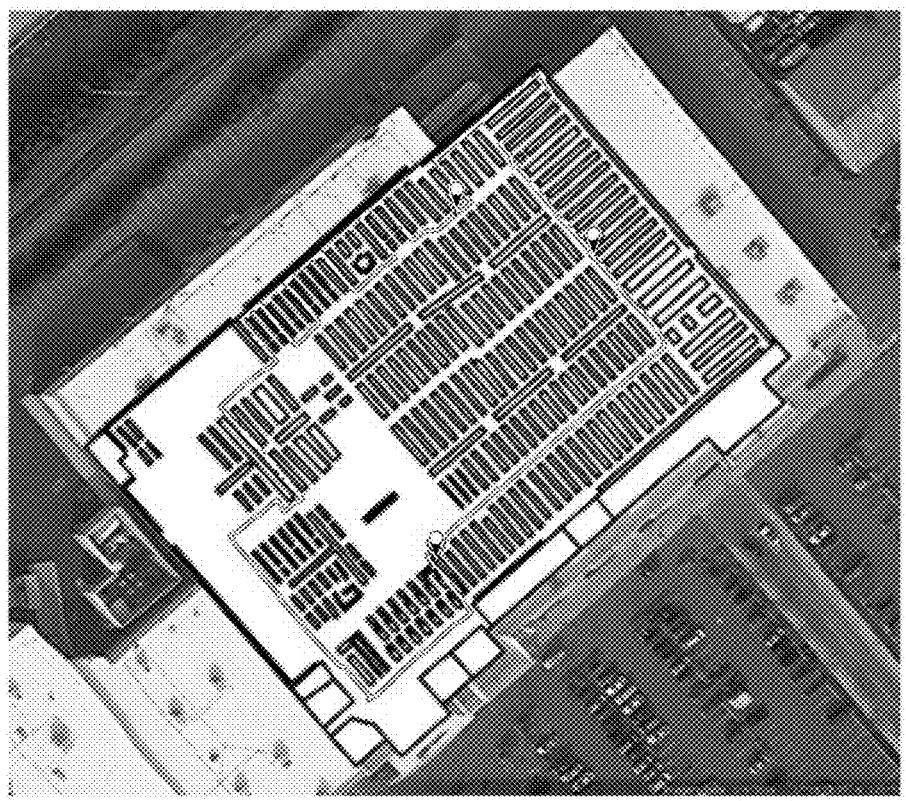
Figure 41:
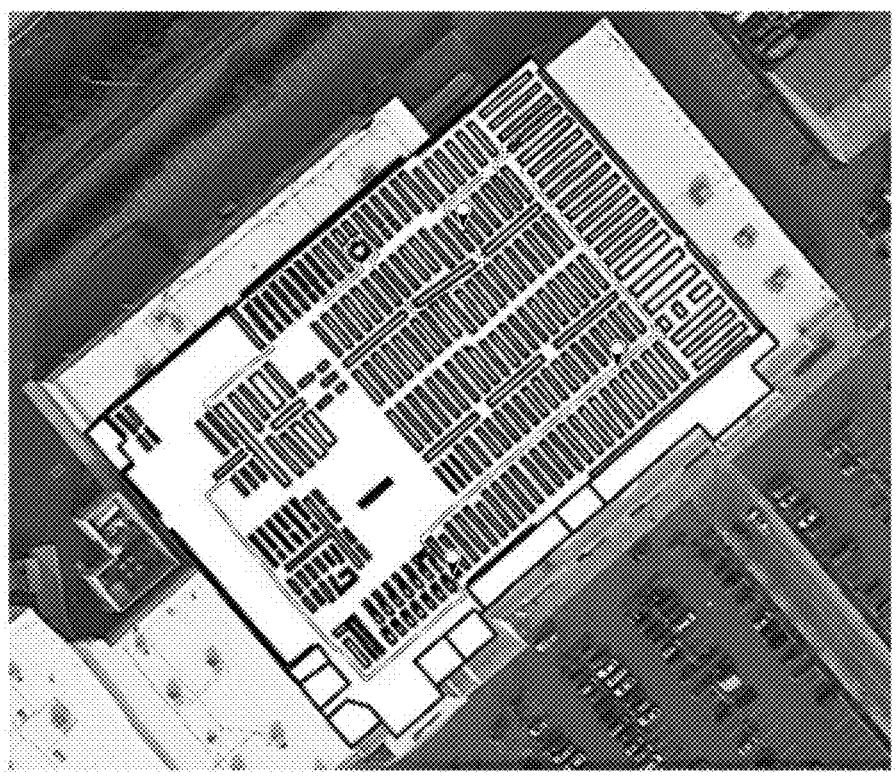
Figure 42:
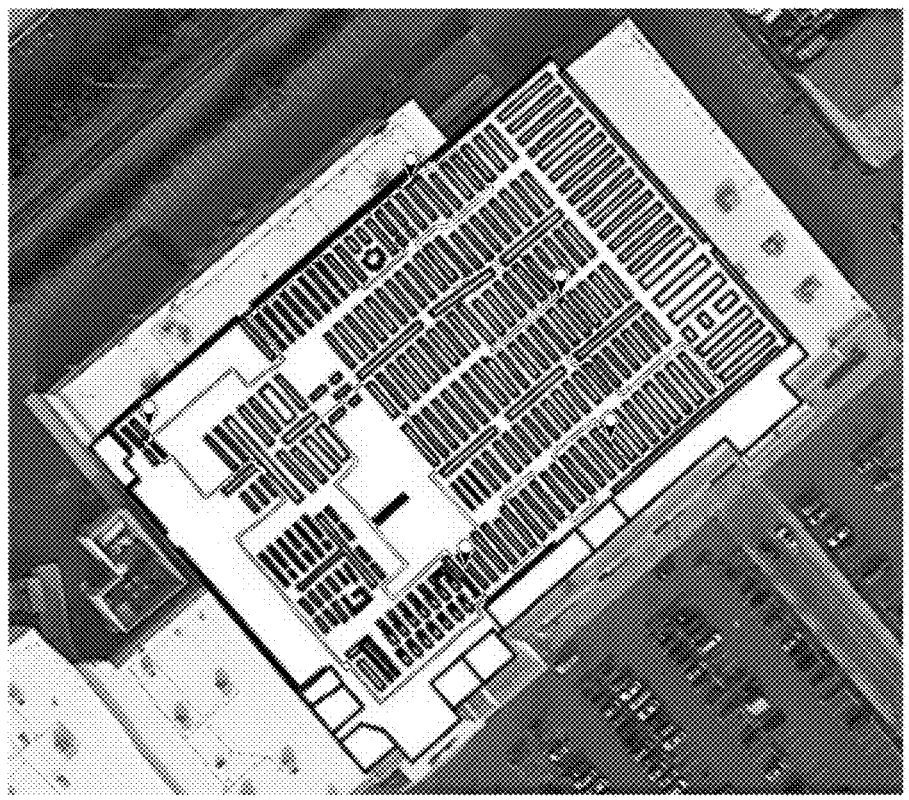

The input heading from the navigation solution, such as provided by navigation module 38, may be expected to be the platform heading, and may be derived from the difference between the device heading and an estimated misalignment angle. As noted above, this derived platform heading from the navigation solution may exhibit a periodic heading oscillation, depending on the use case of portable device. When navigation solutions are processed subsequently according to the techniques of this disclosure, a zero-phase low pass filter may be utilized to remove or reduce the effect of the oscillations without introducing unwanted delay into the signals. An exemplary result of removing heading oscillation is schematically illustrated in FIG. 26, with the results of the navigation solution alone indicated by trace 330 and the enhanced navigation solution following low pass filtering indicted by trace 332.

Additional details regarding the development of trajectories using map matching may be found in co-pending, commonly-assigned U.S. patent application Ser. No. 14/976, 992, filed Dec. 21, 2015, which is entitled "Method and System for Using Offline Map information Aided Enhanced Portable Navigation," and is incorporated by reference in its entirety.

It will also be appreciated that the motion sensor data may indicate one or more periods when the position of the portable device 18 is relatively stationary, such as the fidgeting periods described above. In addition to such periods when portable device 18 is undergoing non-meaningful motion, stationary periods may also be characterized by portable device 18 being substantially static or motionless. Such fidgeting and stationary periods may indicate an interval when the user has paused during the trajectory and may be termed a "dwell." A correlation may exist between a dwell and a point of sale anchor point. Generally, a user may stop when selecting an item for purchase. Correspondingly, a dwell period may be used to help order and/or time tag an anchor point. However, it will be recognized that a complete correlation may not exist. A user may not dwell when selecting an item for purchase if the user simply takes the item while passing by. Similarly, a user may stop or pause without selecting an item for purchase. Nevertheless, dwells may facilitate the ordering process, as they may be used to constrain the route derived by motion sensor data. Further, for scenarios such as revisiting anchor points and/or ambiguous moving directions in a corridor between shelves, dwells may be used to help distinguish the order of anchor points.

To illustrate aspects of the scoring of anchor point sets with respect to trajectories and the subsequent use of that information to assign unique anchor point sets to the trajectories, FIGS. 27-30 show four test trajectories obtained for the same retail venue, with the trajectories represented by outlined traces. The trajectories represent the motion sensor data from four portable devices collected over a given window of time. The sensor data used to construct the trajectories was collected over varying lengths of time, ranging from 5 minutes to 15 minutes. Correspondingly, FIGS. 31-38 depict eight distinct sets of anchor points that were obtained from point of sale information during the corresponding time period, with each anchor point represented by a pin. On average, approximately two items were bought during a 5 minute trajectory, approximately three items were bought during a 10 minute trajectory and approximately four items were bought during a 15 minute trajectory.

The scoring techniques described above were applied to derive a score for each anchor point set with respect to each trajectory. Accordingly, under this scoring technique, a higher score indicates a better match between the anchor point set and the trajectory. Although the results are discussed in this context, a different scoring algorithm may be employed that associates a lower score with the better match in other embodiments, with suitable adjustments in application of the techniques. The results of the scoring are given in Table 1, in the form of a scoring matrix of four rows of trajectories and eight columns anchor point sets.

TABLE 1

|   | 1 | 2 | 3 | 4 | 5 | 6 | 7 | 8 |
|---|---|---|---|---|---|---|---|---|
| 1 | 3.7227 | 0.2151 | 0.0525 | 0.0462 | 0.0384 | 0.0364 | 0.0333 | 0.0297 |
| 2 | 0.8161 | 0.1604 | 3.2639 | 0.4205 | 1.4564 | 0.9151 | 0.0938 | 0.1460 |
| 3 | 0.5158 | 0.1589 | 4.2084 | 2.7726 | 2.0332 | 1.4558 | 0.0942 | 0.1113 |
| 4 | 0.4846 | 0.1664 | 0.2027 | 0.4582 | 0.1489 | 0.1729 | 1.4260 | 0.1287 |

Next, a descending sort may be performed, with the identification of the associated anchor point set given below each score as shown in Table 2. Accordingly, the preliminary assignment as described with regard to FIG. 12 identifies the anchor point sets with the highest scores for each trajectory, such that the highest score for trajectory 1 is anchor point set 1, the highest score for trajectory 2 is anchor point set 3, the highest score for trajectory 3 is anchor point set 3, and the highest score for trajectory 4 is anchor point set 7.

TABLE 2

| 1 | 3.72271 | 0.21512 | 0.05255 | 0.04627 | 0.03843 | 0.03644 | 0.03336 | 0.02978 |
|---|---|---|---|---|---|---|---|---|
| 2 | 3.26393 | 1.45645 | 0.91516 | 0.81611 | 0.42054 | 0.16042 | 0.14608 | 0.09387 |
| 3 | 4.20843 | 2.77264 | 2.03325 | 1.45586 | 0.51581 | 0.15892 | 0.11138 | 0.09427 |
| 4 | 1.42607 | 0.48461 | 0.45824 | 0.20273 | 0.17296 | 0.16642 | 0.14895 | 0.12878 |

The preliminary assignment results in anchor point set 3 being repeated for trajectories 2 and 3. To resolve the redundancy, the procedures described above with respect to FIG. 12 may be performed. First, the differences between the highest score and the next highest score are calculated for trajectories 2 and 3. For trajectory 2, the difference in score between anchor point set 3 and anchor point set 5 is 1.8075 and for trajectory 3, the difference in score between anchor point set 3 and anchor point set 4 is 1.4358. Accordingly, the difference between these differences, diff_diff, may exceed a given difference threshold, so that the trajectory having the greatest differential between highest score and next highest score may be assigned the anchor point set having the highest score. In this example, trajectory 2 exhibits the greatest differential, so it may keep the assignment of anchor point set 3. In turn, trajectory 3 may be assigned the anchor point set with the next highest score, anchor point set 4. If diff_diff did not exceed the difference threshold, the score values of the anchor point sets with the next highest scores would be compared. In this example, the next highest score value for trajectory 2 is 1.4564 and the next highest score value for trajectory 3 is 2.7726. As a result, trajectory 2 would again retain assignment of anchor point set 3, the anchor point set with the highest score, while trajectory 3 would be reassigned to anchor point set 4, the anchor point set with the next highest score. Although this provides the same assignment in this example, other data may result in a different assignment.

Based on the above assignments, a final assignment provided by assignment module 48 for this test results in anchor point set 1 being assigned to trajectory 1, anchor point set 3 being assigned to trajectory 2, anchor point set 4 being assigned to trajectory 3 and anchor point set 7 being assigned to trajectory 4. This assignment is depicted in FIGS. 39-42, respectively, with each trajectory shown with the corresponding anchor point set superimposed. As may be seen, each trajectory exhibits a close fit with its assigned anchor point set, as indicated by each anchor point falling on or adjacent the trajectory.

CONTEMPLATED EMBODIMENTS

Depending on the architecture of portable device 18, sensor processor 26 and inertial sensor 30 may be formed on different chips, or as shown, may reside on the same chip. A sensor fusion algorithm employed to calculate the orientation of device 18 may be performed externally to sensor processor 26 and MPU 24, such as by host processor 20, or may be performed by MPU 24. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits.

One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure may be combined with any navigation solution independent of the type of the state estimation or filtering technique used in this navigation solution. The state estimation technique can be linear, non-linear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigation information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigation information (e.g. GNSS); the forward integrated navigation solution in the device integrating the available sensors with the absolute navigation information (e.g. GNSS) and possibly with the optional speed or velocity readings; or a backward smoothed integrated navigation solution integrating the available sensors with the absolute navigation information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map aided or model aided routine. Map aided or model aided can further enhance the navigation solution during the absolute navigation information (such as GNSS) degradation or interruption. In the case of model aided, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for assigning a set of anchor points to a trajectory of a portable device comprising:
    a) obtaining a trajectory for the portable device for a first period of time in a store, wherein the trajectory is based at least in part on motion sensor data from the portable device corresponding to the first period of time;
    b) obtaining point of sale information overlapping the first period of time, wherein the point of sale information comprises a plurality of anchor point sets, wherein each anchor point set comprises anchor point(s) corresponding to purchased item(s) from a same single transaction, wherein each anchor point is derived by associating a product location within the store to each purchased item, and wherein the plurality of anchor point sets correspond to transactions from the store overlapping the first period of time;
    c) scoring each anchor point set in relation to the trajectory; and
    d) assigning one of the plurality of anchor point sets to the trajectory based at least in part on the scoring of each anchor point set.

2. The method of claim 1, wherein scoring each anchor point set comprises cumulating distances between a known location of each anchor point of the anchor point set and the trajectory.

3. The method of claim 1, further comprising decomposing the trajectory into segments by characterizing turns of the trajectory, wherein scoring each anchor point set comprises cumulating distances between a known location of each anchor point of the anchor point set and a closest segment of the trajectory.

4. The method of claim 3, wherein characterizing turns of the trajectory comprises identifying pairs of sequential turns and a distance traveled between each pair of sequential turns.

5. The method of claim 4, wherein the distance traveled between a pair of sequential turns is determined based at least in part on step length.

6. The method of claim 3, wherein characterizing turns of the trajectory further comprises determining a link for each pair of sequential turns, wherein the link comprises a portion of the trajectory having the distance traveled between the pair of sequential turns and a heading.

7. The method of claim 3, further comprising identifying a turn based at least in part on a rate of heading change of the portable device exceeding a threshold.

8. The method of claim of claim 7, further comprising filtering heading information before identifying a turn.

9. The method of claim 7, wherein the start of the turn is determined when the rate of heading change exceeds the threshold and the end of the turn is determined when the rate of heading change falls below the threshold.

10. The method of claim 3, further comprising identifying a turn based at least in part on a detected fidgeting period and a change of heading during the fidgeting period.

11. The method of claim 10, wherein a start of the turn is determined when the fidgeting period begins and an end of the turn is determined when the fidgeting period ends.

12. The method of claim 3, further comprising identifying a turn based at least in part on determining an angle formed by adjacent segments of the trajectory exceeds a threshold.

13. The method of claim 3, wherein decomposing the trajectory into segments further comprises identifying a floor change.

14. The method of claim 1, wherein a single anchor point set is overlapping with the first period of time, further comprising assigning the single anchor point set to the trajectory when scoring of the single anchor point set exceeds a threshold.

15. The method of claim 1, further comprising assigning the anchor point set having a highest score to the trajectory.

16. The method of claim 1, wherein the point of sale information comprises a plurality of anchor point sets, further comprising:
    a) obtaining a plurality of trajectories, wherein each trajectory is for one or more portable devices for the first period of time;
    b) scoring each anchor point set in relation to each trajectory; and
    c) uniquely assigning at least some of the anchor point sets to at least some of the trajectories based at least in part on the scoring of each anchor point set.

17. The method of claim 16, wherein there are more trajectories than anchor point sets and each anchor point set is assigned to a different trajectory based at least in part on the scoring of each anchor point set and any remaining trajectories are unassigned.

18. The method of claim 16, wherein there are more anchor point sets than trajectories and each trajectory is assigned a different anchor point set based at least in part on the scoring of each anchor point set and any remaining anchor point sets are unassigned.

19. The method of claim 16, wherein uniquely assigning at least some of the anchor point sets to at least some of the trajectories comprises assigning an anchor point set having a highest score with regard to each trajectory to that trajectory.

20. The method of claim 16, wherein uniquely assigning at least some of the anchor point sets to at least some of the trajectories comprises assigning an anchor point set having a next highest score with regard to a trajectory to that trajectory if one anchor point set has a highest score with regard to more than one trajectory.

21. The method of claim 20, further comprising selecting a trajectory to be assigned the anchor point set having the next highest score is based at least in part on comparing differences between a highest score and a next highest score for trajectories in which one anchor point set has the highest score.

22. The method of claim 21, further comprising assigning the anchor point set with the highest score to a trajectory having a lower next highest score when the differences do not exceed a threshold.

23. The method of claim 21, further comprising assigning the anchor point set with the highest score to a trajectory having a greater difference between a highest score and a next highest score when the differences exceed a threshold.

24. The method of claim 1, further comprising obtaining the trajectory for the portable device by obtaining sensor data for the portable device representing motion of the portable device at a plurality of epochs over the first period of time and deriving the trajectory based at least in part on the sensor data, wherein the mobility of the portable device is constrained or unconstrained within a platform and wherein the portable device may be tilted to any orientation.

25. The method of claim 24, wherein deriving the trajectory comprises performing a forward processing operation over the first period of time.

26. The method of claim 24, wherein deriving the trajectory comprises performing a backward processing operation over the first period of time.

27. The method of claim 24, wherein deriving the trajectory comprises performing a forward processing operation and a backward processing operation over the first period of time.

28. The method of claim 24, wherein deriving the trajectory comprises performing a forward processing operation, a backward processing operation over the first period of time, and a combination of the forward processing and backward processing.

29. The method of claim 24, wherein deriving the trajectory comprises performing a smoothing operation over the first period of time.

30. The method of claim 24, wherein deriving the trajectory comprises performing a backward smoothing operation over the first period of time.

31. The method of claim 24, wherein deriving the trajectory comprises performing a multiple pass processing operation over the first period of time.

32. The method of claim 24, wherein deriving the trajectory further comprises obtaining map information for an area encompassing the trajectory and matching the trajectory to the map information.

33. The method of claim 32, further comprising transforming the map information by extracting map entities.

34. The method of claim 33, further comprising clipping at least one foreground map entity from a background entity.

35. The method of claim 34, wherein clipping the background entity defines a traversable area.

36. The method of claim 32, further comprising transforming the map information by representing a map entity as a relatively complex polygon and decomposing the polygon into a plurality of relatively more simple polygons.

37. The method of claim 32, further comprising transforming the obtained map information into a grid of connected traces and nodes.

38. The method of claim 37, wherein transforming the obtained map comprises constructing a voronoi diagram.

39. The method of claim 37, wherein each node is equidistant from at least three map entities and wherein each trace is equidistant from less than three map entities.

40. The method of claim 1, further comprising updating a navigation solution for the portable device based at least in part on the assigned anchor point set.

41. The method of claim 1, further comprising deriving user analytics based at least in part on the assigned anchor point set.

42. The method of claim 40, further comprising deriving user analytics based at least in part on the updated navigation solution.

43. A system for assigning a set of anchor points to a trajectory of a portable device comprising:
a) a portable device comprising an integrated sensor assembly, configured to output motion sensor data for the portable device representing motion of the portable device at a plurality of epochs over a first period of time, wherein the mobility of the portable device is constrained or unconstrained within a platform and wherein the portable device may be tilted to any orientation, and a communications module for transmitting information corresponding to the epochs; and
b) remote processing resources configured to receive the information from the portable device and having a processor configured to implement an assignment module to:
  i) obtain a trajectory for the portable device for the first period of time in a store, wherein the trajectory is based at least in part on the motion sensor data from the portable device corresponding to the first period of time;
  ii) obtain point of sale information overlapping the first period of time, wherein the point of sale information comprises a plurality of anchor point sets, wherein each anchor point set comprises anchor point(s) corresponding to purchased item(s) from a same single transaction, wherein each anchor point is derived by associating a product location within the store to each purchased item, and wherein the plurality of anchor point sets correspond to transactions from the store overlapping the first period of time;
  iii) score each anchor point set in relation to the trajectory; and
  iv) assign one of the plurality of anchor point sets to the trajectory based at least in part on the scoring of each anchor point set.

44. The system of claim 43, wherein the information received by the remote processing resources comprises sensor data for the portable device and wherein the assignment module is further configured to derive the trajectory based at least in part on the sensor data.

45. The system of claim 43, wherein the portable device further comprises a navigation module configured to derive the trajectory based at least in part on the sensor data at the plurality of epochs and wherein the communications module transmits the trajectory.

46. The system of claim 43, wherein the sensor assembly of the portable device includes an accelerometer and a gyroscope.

47. The system of claim 43, wherein the sensor assembly of the portable device comprises an inertial sensor implemented as a Micro Electro Mechanical System (MEMS).

48. The system of claim 43, wherein the point of sale information comprises a plurality of anchor point sets, wherein the assignment module is further configured to:
a) obtain a plurality of trajectories, wherein each trajectory is for one or more portable devices for the first period of time;
b) score each anchor point set in relation to each trajectory; and
c) uniquely assign at least some of the anchor point sets to at least some of the trajectories based at least in part on the scoring of each anchor point set.

49. The system of claim 48, wherein the remote processing resources receives sensor data for the one or more portable devices for the plurality of trajectories and wherein the assignment module is further configured to derive each of the plurality of trajectories based at least in part on the respective sensor data.

50. The system of claim 48, wherein the remote processing resources receives the plurality of trajectories for the one or more portable devices based at least in part on the respective sensor data from the one or more portable devices.

51. A server for assigning a set of anchor points to a trajectory of a portable device comprising processing resources configured to implement an assignment module to:

a) obtain a trajectory for the portable device for a first period of time in a store, wherein the trajectory is based at least in part on motion sensor data from the portable device corresponding to the first period of time;

b) obtain point of sale information overlapping the first period of time, wherein the point of sale information comprises a plurality of anchor point sets, wherein each anchor point set comprises anchor point(s) corresponding to purchased item(s) from a same single transaction, wherein each anchor point is derived by associating a product location within the store to each purchased item, and wherein the plurality of anchor point sets correspond to transactions from the store overlapping the first period of time;

c) score each anchor point set in relation to the trajectory; and d) assign one of the plurality of anchor point sets to the trajectory based at least in part on the scoring of each anchor point set.

52. The server of claim 51, wherein the server receives sensor data for the portable device and wherein the assignment module is further configured to derive the trajectory based at least in part on the sensor data.

53. The server of claim 51, wherein the server receives the trajectory based at least in part on the sensor data from the portable device.

54. The server of claim 51, wherein the point of sale information comprises a plurality of anchor point sets, wherein the assignment module is further configured to:

a) obtain a plurality of trajectories, wherein each trajectory is for one or more portable devices for the first period of time;

b) score each anchor point set in relation to each trajectory; and c) uniquely assign at least some of the anchor point sets to at least some of the trajectories based at least in part on the scoring of each anchor point set.

55. The server of claim 51, wherein the server receives sensor data for the one or more portable devices for the plurality of trajectories and wherein the assignment module is further configured to derive each of the plurality of trajectories based at least in part on the respective sensor data.

56. The server of claim 51, wherein the server receives the plurality of trajectories for the one or more portable devices based at least in part on the respective sensor data from the one or more portable devices.

* * * * *